United States Patent
Bhansali et al.

(10) Patent No.: US 10,289,315 B2
(45) Date of Patent: May 14, 2019

(54) MANAGING I/O OPERATIONS OF LARGE DATA OBJECTS IN A CACHE MEMORY DEVICE BY DIVIDING INTO CHUNKS

(71) Applicant: Western Digital Technologies, Inc., San Jose, CA (US)

(72) Inventors: Akhil Bhansali, Pune (IN); Kirankumar Mehta, Pune (IN); Bruno Keymolen, Ghent (BE); Rajendra Kumar Bhairy, Pune (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/470,787

(22) Filed: Mar. 27, 2017

(65) Prior Publication Data
US 2018/0275898 A1 Sep. 27, 2018

(51) Int. Cl.
*G06F 3/06* (2006.01)
*G06F 12/08* (2016.01)
(Continued)

(52) U.S. Cl.
CPC ............ *G06F 3/0613* (2013.01); *G06F 3/065* (2013.01); *G06F 3/067* (2013.01); *G06F 3/0608* (2013.01); *G06F 3/0619* (2013.01); *G06F 3/0665* (2013.01); *G06F 3/0679* (2013.01); *G06F 11/14* (2013.01); *G06F 12/0868* (2013.01); *G06F 12/0871* (2013.01); *G06F 12/0875* (2013.01);
(Continued)

(58) Field of Classification Search
CPC ...... G06F 3/0608; G06F 3/0613; G06F 3/064; G06F 3/0679; G06F 2003/0691; G06F 12/0871; G06F 12/0888; G06F 12/0891; G06F 12/12; G06F 2212/455
See application file for complete search history.

(56) References Cited

U.S. PATENT DOCUMENTS 6,128,623 A 10/2000 Mattis et al.
8,458,236 B2 6/2013 Sudhakar et al.
(Continued)

OTHER PUBLICATIONS

International Search Report and Written Opinion for International Application No. PCT/US2017/064368 dated Mar. 6, 2018, 15 pages.
(Continued)

*Primary Examiner* — Hal Schnee
(74) *Attorney, Agent, or Firm* — Patent Law Works LLP

(57) ABSTRACT

Various aspects for managing input/output (I/O) operations for data objects (e.g., large data objects (LOBs)), in a storage system are provided. For instance, a method may include receiving an I/O request for executing an I/O operation on a data object, determining the size of the data object, and determining the data object to be a non-conforming data object relative to a storage threshold of a cache memory device. The method may further include dividing the non-conforming data object into multiple data chunks, each of the data chunks having a size that is less than the storage threshold, moving one or more data chunks stored in one or more memory spaces of the cache memory device to a long-term memory device to free up the one or more memory spaces, and storing one or more of the data chunks of the non-conforming data object in the freed-up memory space(s).

20 Claims, 17 Drawing Sheets

(51) Int. Cl.
*G06F 12/0871* (2016.01)
*G06F 12/0868* (2016.01)
*G06F 12/0875* (2016.01)
*G06F 11/14* (2006.01)

(52) U.S. Cl.
CPC ........... *G06F 2212/1032* (2013.01); *G06F 2212/214* (2013.01); *G06F 2212/222* (2013.01); *G06F 2212/312* (2013.01); *G06F 2212/401* (2013.01); *G06F 2212/455* (2013.01); *G06F 2212/462* (2013.01)

(56) References Cited

U.S. PATENT DOCUMENTS

| | | | |
|---|---|---|---|
| 8,782,441 | B1 | 7/2014 | Osterwalder et al. |
| 8,849,759 | B2 | 9/2014 | Bestler et al. |
| 9,208,181 | B2 | 12/2015 | Pandey et al. |
| 9,223,800 | B1 | 12/2015 | Faibish et al. |
| 9,268,652 | B1 * | 2/2016 | Salyers .............. G06F 11/1464 |
| 9,274,956 | B1 | 3/2016 | Salyers et al. |
| 9,405,483 | B1 | 8/2016 | Wei et al. |
| 9,785,438 | B1 * | 10/2017 | Weikal ................ G06F 9/3004 |
| 9,842,052 | B2 * | 12/2017 | Schreter ............. G06F 12/0848 |
| 2006/0064564 | A1 | 3/2006 | Achanta et al. |
| 2008/0091840 | A1 * | 4/2008 | Guo ................... H04L 65/4084 709/231 |
| 2013/0074136 | A1 * | 3/2013 | Chetlur ............... H04N 21/231 725/95 |
| 2013/0318300 | A1 | 11/2013 | Agrawal et al. |
| 2014/0359632 | A1 * | 12/2014 | Kishan .................. G06F 9/5038 718/103 |
| 2015/0019502 | A1 | 1/2015 | Aronovich et al. |
| 2015/0058384 | A1 | 2/2015 | Karamanolis et al. |
| 2015/0156174 | A1 | 6/2015 | Fahey et al. |
| 2015/0199244 | A1 | 7/2015 | Venkatachalam et al. |
| 2016/0004636 | A1 * | 1/2016 | Yang .................. G06F 12/0886 711/118 |
| 2016/0140224 | A1 * | 5/2016 | Jin .................... G06F 17/30758 700/94 |
| 2016/0179682 | A1 * | 6/2016 | Moretti ............... G06F 12/0871 711/125 |
| 2016/0239204 | A1 * | 8/2016 | Harada ................. G06F 3/061 |
| 2016/0357648 | A1 * | 12/2016 | Keremane ........... G06F 11/2069 |
| 2017/0109283 | A1 * | 4/2017 | Ash ..................... G06F 12/0815 |
| 2017/0318119 | A1 * | 11/2017 | Zbiljic ................ H04L 67/2847 |
| 2018/0067869 | A1 * | 3/2018 | Yang .................... G06F 12/126 |

OTHER PUBLICATIONS

N. Gehani et al. "OBFS: A File System for Object-based Storage Devices" dated 1994, 18 pages, found at <http://www.ssrc.ucsc.edu/Papers/wang-mss04b.pdf>.

Wang et al. "OdeFS: A File System Interface to an Object-Oriented Database" dated 2004, 18 pages, found at <http://citeseerx.ist.psu.edu/viewdoc/download?doi=10.1.1.35.285&rep=rep1&type=pdf>.

Smigielski "OpenIO Architecture" dated Jun. 30, 2015, 6 pages, GitHub, found at <https://github.com/open-io/oio-sds/wiki/OpenIO-Architecture>.

* cited by examiner

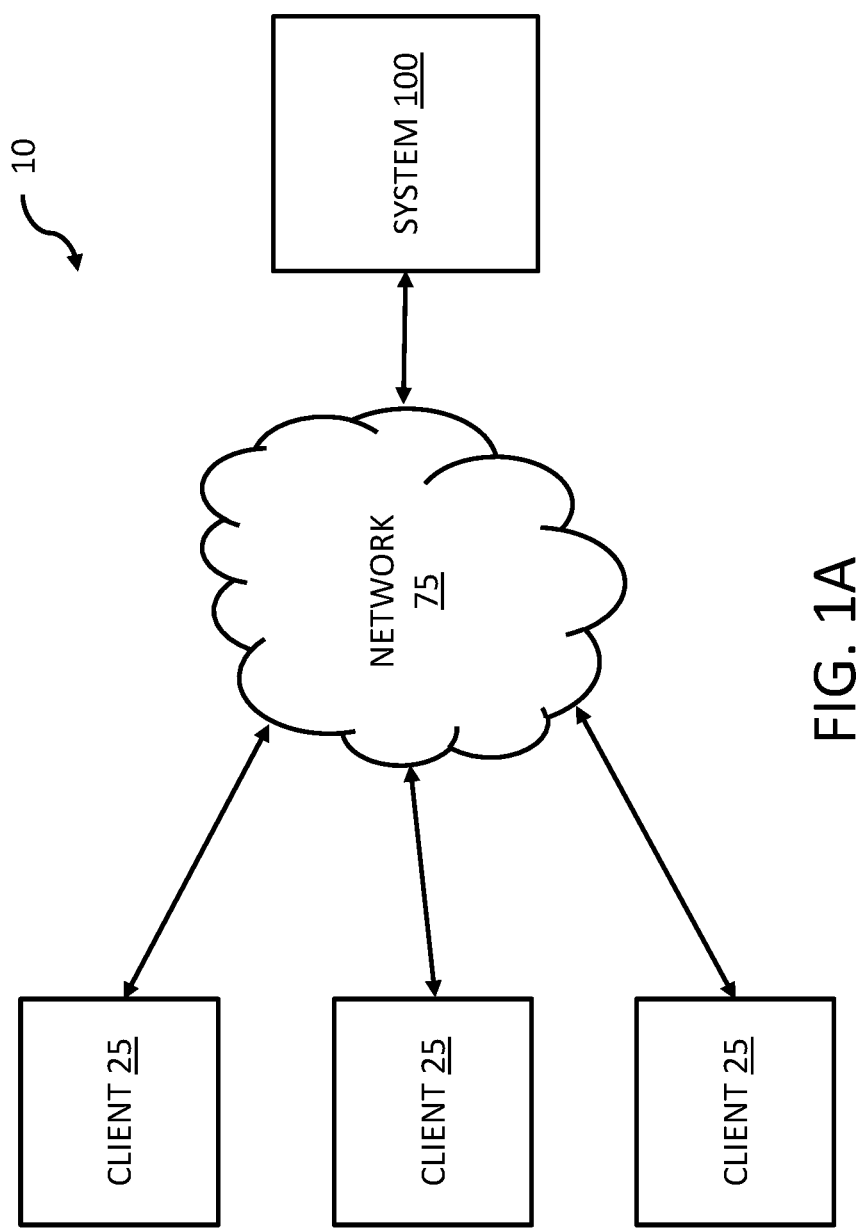

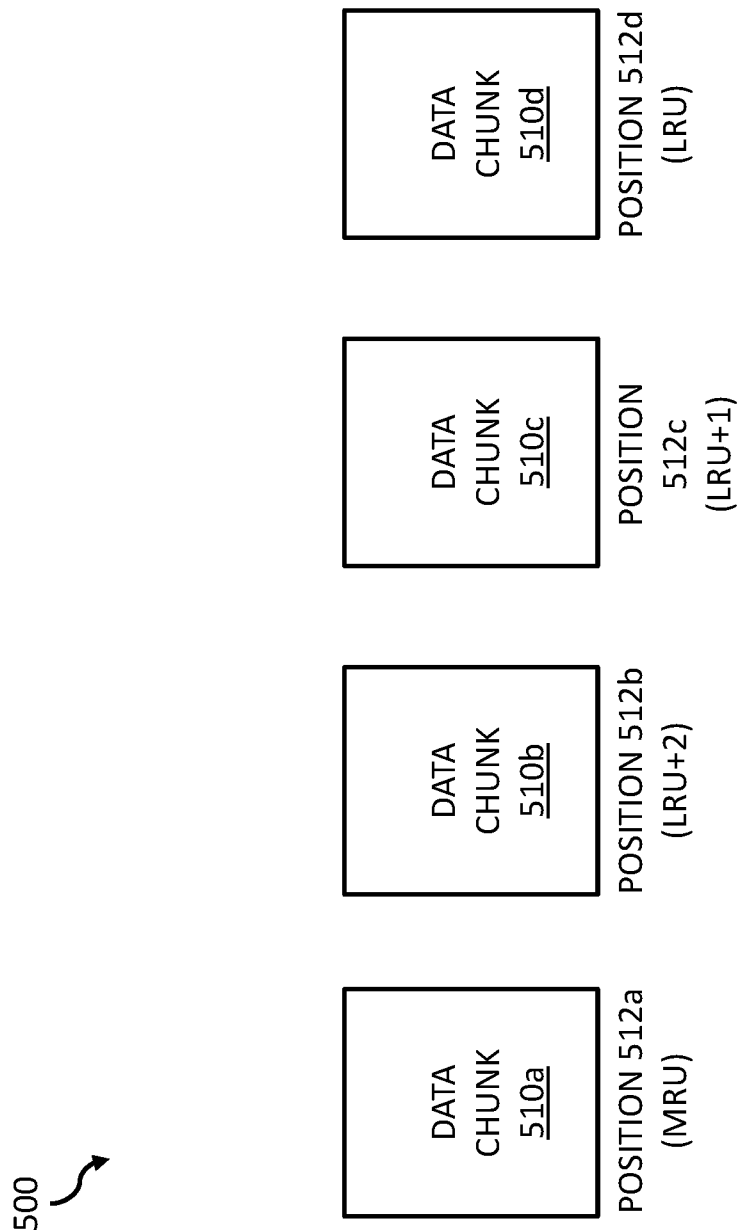

MANAGING I/O OPERATIONS OF LARGE DATA OBJECTS IN A CACHE MEMORY DEVICE BY DIVIDING INTO CHUNKS

BACKGROUND

Field of the Technology

The present disclosure relates to computing systems and, more particularly, to managing data objects in a storage system.

Description of Related Art

Various computing networks and systems are capable of storing data. A subset of these computing networks and systems are configured to store data as data objects. Some of these data objects are capable of containing large amounts of data (e.g., at least two terabytes (2 TB) of data).

Typically, when a computing system receives an input/output (I/O) request to write a data object to long-term storage, the data object is initially written, in its entirety, to a storage buffer of a cache. The data object in the storage buffer is subsequently written to long-term storage and may be accessed (e.g., via read requests and/or read-write requests) in the future so that the data object, in its entirety, can be read or modified (e.g., read and subsequently written with new data).

For access to a data object in long-term storage via read requests, the entire data object is read to the storage buffer. That is, all read requests to read data in the data object result in the whole data object being read to the storage buffer, even if only a subset or a small portion of the data in the data object needs reading.

For access to a data object in long-term storage via read-write requests (e.g., to modify data in the data object), the entire data object is read to the storage buffer, the data desiring modification is changed, and the entire modified data object is eventually written (re-written) to long-term storage. That is, all read-write requests to modify data in the data object result in the whole data object being read to the storage buffer (even if the data needing modification is a subset of the entire data object or only a small portion of the data in the data object), data in the data object is modified, and the entire modified data object is eventually written (re-written) to long-term storage, even though only a subset or a small portion of the data in the data object needed modification.

While some previous computing networks and systems are able to store data objects, these computing networks and systems are not as reliable and/or efficient as they could be. In some cases, practical considerations, such as cost, size limitations, storage limitations, etc., limit the size of a cache memory device of a storage system. As such, some storage systems may fail (e.g., crash, etc.) and/or underperform (e.g., have latency issues, etc.) in situations in which one or more I/O requests (i.e., read, write, or read-write requests) that correspond to or are associated with a data object that includes a size larger than the size of a cache memory device (e.g., buffer size) in the storage system. Other issues encountered by some storage systems can be rooted in the cache memory device being exhausted (i.e., full and/or storing an amount of data above a predetermined threshold amount of data) and/or not storing one or more desired data objects and/or data chunks. If a cache memory device is insufficient to satisfy read requests and/or has reached its high-water mark for write requests, performance of the storage system can drop off considerably.

For example, previous computing networks and systems can struggle to write data objects when the data objects have a size that is larger than the size of a storage buffer in the computing network and/or system. That is, at least some networks and/or systems may malfunction (e.g., crash) and/or experience latency issues when the size of a data object included in a write request is larger than the size of its storage buffer because the storage buffer is unable to write data objects larger than its storage capacity.

Some previous computing networks and/or systems may experience undue latency issues because they perform read operations by reading an entire data object to its storage buffer from long-term storage when only a subset of the data in a data object needs reading. That is, these previous computing networks and systems may take more time than necessary to perform read operations because the entire data object is read to the storage buffer when only a portion of the data in the data object (i.e., data desiring to be read or desired data) needs to be read, which increases the amount of time it takes to read the desired data to the storage buffer because superfluous data is read to the storage buffer.

Similarly, undue latency issues may be experienced by some previous computing networks and/or systems when modifying data in long-term storage because they perform read-write operations on the entire data object when only a subset of the data in a data object needs modification. That is, some pervious computing networks and systems exhibit lag when performing read-write operations because the entire data object is read to the buffer memory when only a portion of the data in the data object (i.e., data desiring to be modified or desired data) needs to be modified. This increases the amount of time it takes to modify the desired data because superfluous data is read to the storage buffer and subsequently written (re-written) to long-term storage.

SUMMARY

Various aspects for managing input/output (I/O) operations for data objects, particularly, but not limited to, large data objects (LOBs), in a storage system are described. In an innovative aspect, a system comprises a first non-volatile cache memory device and a storage controller coupled to the cache memory device. The storage controller includes one or more processing devices for executing instructions in one or more applications configured to cause the storage controller to perform operations comprising receiving an I/O request for a data object, determining a size of the data object, and determining the data object to be a first non-conforming data object relative to the storage threshold of the first non-volatile cache memory device. In some embodiments, the storage controller further performs operations comprising dividing the first non-conforming data object into a plurality of data chunks, each of the data chunks having a size that is less than the storage threshold, moving one or more data chunks stored in one or more memory spaces of the first non-volatile cache memory device to a long-term memory device to free up the one or more memory spaces, and storing one or more of the data chunks of the first non-conforming data object in the freed-up one or more memory spaces of the first non-volatile cache memory device.

In various embodiments, the I/O request is a write request and the storage controller, when performing the operations for storing the one or more data chunks of the first non-conforming data object, further performs operations comprising writing each of the one or more data chunks of the first non-conforming data object to the freed-up one or more memory spaces of the first non-volatile cache memory device. In some embodiments, the I/O request is a read request and the storage controller, when performing the operations for storing the one or more data chunks of the first non-conforming data object, further performs operations comprising reading one or more data chunks stored in the long-term memory device to the first non-volatile cache memory device. In further embodiments, the I/O request is a read-write request and the storage controller, when performing the operations for storing the one or more of the data chunks of the first non-conforming data object, further performs operations comprising reading one or more data chunks stored in the long-term memory device to the first non-volatile cache memory device, modifying data in the one or more read data chunks to generate one or more modified data chunks, and writing the one or more modified data chunks to the long-term memory device.

Some systems comprise the long-term memory device being coupled to the cache memory device, where determining the data object to be a first non-conforming object is further based on the size of the data object exceeding an available storage capacity of the first non-volatile cache memory device. Further, storing the one or more of the data chunks of the first non-conforming data object in the freed-up one or more memory spaces includes, for each data chunk of the first non-conforming data object, determining if there is sufficient space for storing each data chunk in the first non-volatile cache memory device and, when there is not sufficient space, writing one or more existing data chunks that are associated with one or more data objects other than the first non-conforming data object and currently stored in the first non-volatile cache memory device to the long-term memory device, freeing up the one or more memory spaces of the one or more existing data chunks to generate the freed-up one or more memory spaces, and writing each data chunk to the freed-up one or more memory spaces in the first non-volatile cache memory device.

In various embodiments, the system further comprises a second non-volatile cache memory device coupled to the first non-volatile cache memory device and the storage controller further performs operations comprising replicating each data chunk stored in the first non-volatile cache memory device to the second non-volatile cache memory device. The first non-volatile cache memory device, in some embodiments, includes a buffer size and the storage threshold reflects the buffer size. In further embodiments, the first non-volatile cache memory device comprises a flash memory device.

The storage controller, in various embodiments, is configured to be coupled to a network that is in communication with one or more client devices. In some embodiments, the storage controller is located between the one or more client devices and the first non-volatile cache memory device when coupled to the network. In further embodiments, the long-term memory device is a portion of a local storage network and/or a portion of an enterprise storage service.

In another innovative aspect, a system comprises a non-volatile cache memory device including a buffer size, means for receiving an I/O request for a data object, means for determining a size of the data object, and means for determining the data object to be a non-conforming data object relative to the buffer size of the non-volatile cache memory device. The system, in various embodiments, further comprises means for dividing the non-conforming data object into a plurality of data chunks, each of the data chunks having a size that is less than the buffer size, means for moving one or more data chunks stored in one or more memory spaces of the non-volatile cache memory device to a long-term memory device to free up the one or more memory spaces, and means for storing one or more of the data chunks of the non-conforming data object in the freed-up one or more memory spaces of the non-volatile cache memory device.

In various embodiments, the I/O request is a write request and the means for storing one or more of the data chunks of the non-conforming data object further comprises means for writing each of the one or more data chunks of the non-conforming data object to the freed-up one or more memory spaces of the non-volatile cache memory device. In some embodiments, the I/O request is a read request and the means for storing one or more of the data chunks of the non-conforming data object further comprises means for reading one or more data chunks stored in the long-term memory device to the cache memory device. In further embodiments, the I/O request is a read-write request and the means for storing one or more of the data chunks of the non-conforming data object further comprises means for reading one or more data chunks stored in the long-term memory device to the cache memory device, means for modifying data in the one or more read data chunks to generate one or more modified data chunks, and means for writing the one or more modified data chunks to the long-term memory device.

In some embodiments, the system further comprises the long-term memory device coupled to the cache memory device and the means for determining the data object to be a non-conforming object comprises means for basing the determination on the size of the data object exceeding the buffer size. In some systems, the means for storing the one or more of the data chunks of the non-conforming data object in the one or more memory spaces includes, for each data chunk of the non-conforming data object, means for determining if there is sufficient space for storing each data chunk in the non-volatile cache memory device and, when there is not sufficient space, means for writing one or more existing data chunks that are associated with one or more data objects other than the non-conforming data object and currently stored in the non-volatile cache memory device to the long-term memory device, means for freeing up the one or more memory spaces of the one or more existing data chunks to generate the freed-up one or more memory spaces, and means for writing each data chunk to the freed-up one or more memory spaces in the non-volatile cache memory device.

In yet another innovative aspect, a method of operation in a non-volatile memory system including a set of non-volatile memory devices comprises receiving, at a storage controller coupled to a non-volatile cache memory device including a storage threshold, an I/O command for executing an I/O operation on a data object, determining a size of the data object, determining a size of the data object, and determining the data object to be a non-conforming data object relative to the storage threshold of the cache memory device. The method, in various embodiments, further comprises dividing the non-conforming data object into a plurality of data chunks, each of the data chunks having a size that is less than the storage threshold, moving one or more data chunks stored in one or more memory spaces of the non-volatile cache memory device to a long-term memory device to free up the one or more memory spaces, and storing one or more of the data chunks of the non-conforming data object in the freed-up one or more memory spaces of the non-volatile cache memory device.

In various embodiments, the I/O request is a write request and storing the one or more of the data chunks of the non-conforming data object further comprises writing each of the one or more data chunks of the non-conforming data object to the freed-up one or more memory spaces of the non-volatile cache memory device. In some embodiments, the I/O request is a read request and storing the one or more of the data chunks of the non-conforming data object further comprises reading each of the one or more data chunks of the non-conforming data object to the freed-up one or more memory spaces of the non-volatile cache memory device. In further embodiments, the I/O request is a read-write request and storing the one or more of the data chunks of the non-conforming data object further comprises reading each of the one or more data chunks of the non-conforming data object to the freed-up one or more memory spaces of the non-volatile cache memory device, modifying data in each of the one or more read data chunks to generate one or more modified data chunks, and writing each of the one or more modified data chunks to the long-term memory device.

In some embodiments, determining the data object to be a non-conforming object is further based on the size of the data object exceeding an available storage capacity of the cache memory device. In some methods, storing the one or more of the data chunks of the non-conforming data object in the one or more memory spaces includes, for each data chunk of the non-conforming data object, determining if there is sufficient space for storing each data chunk in the non-volatile cache memory device and, when there is not sufficient space, writing one or more existing data chunks that are associated with one or more data objects other than the non-conforming data object and currently stored in the non-volatile cache memory device to the long-term memory device, freeing up the one or more memory spaces of the one or more existing data chunks to generate the freed-up one or more memory spaces, and writing each data chunk to the freed-up one or more memory spaces in the non-volatile cache memory device.

The various embodiments disclosed herein include operations to overcome or at least reduce the issues in the previous storage networks and/or systems discussed above and, accordingly, are more reliable and/or more efficient than other computing networks and/or networks. That is, the various embodiments disclosed herein include hardware and/or software with functionality to avoid or at least decrease the issues related to reliability and/or latency associated with writing large data objects (e.g., data objects including a size greater than the size or storage capacity of a cache memory device). Furthermore, the various embodiments disclosed herein include hardware and/or software to avoid or at least decrease the latency issues associated with requests to read data (e.g., read requests) and/or requests to modify data (e.g., read-write requests). Accordingly, the embodiments disclosed therein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 1A is a diagram of an example computing network for storing data;

FIGS. 5A through 5G are diagrams illustrating various examples of a least recently used (LRU) technique utilized by one embodiment of a storage controller for managing a cache memory device;

DETAILED DESCRIPTION

Figure 1B:
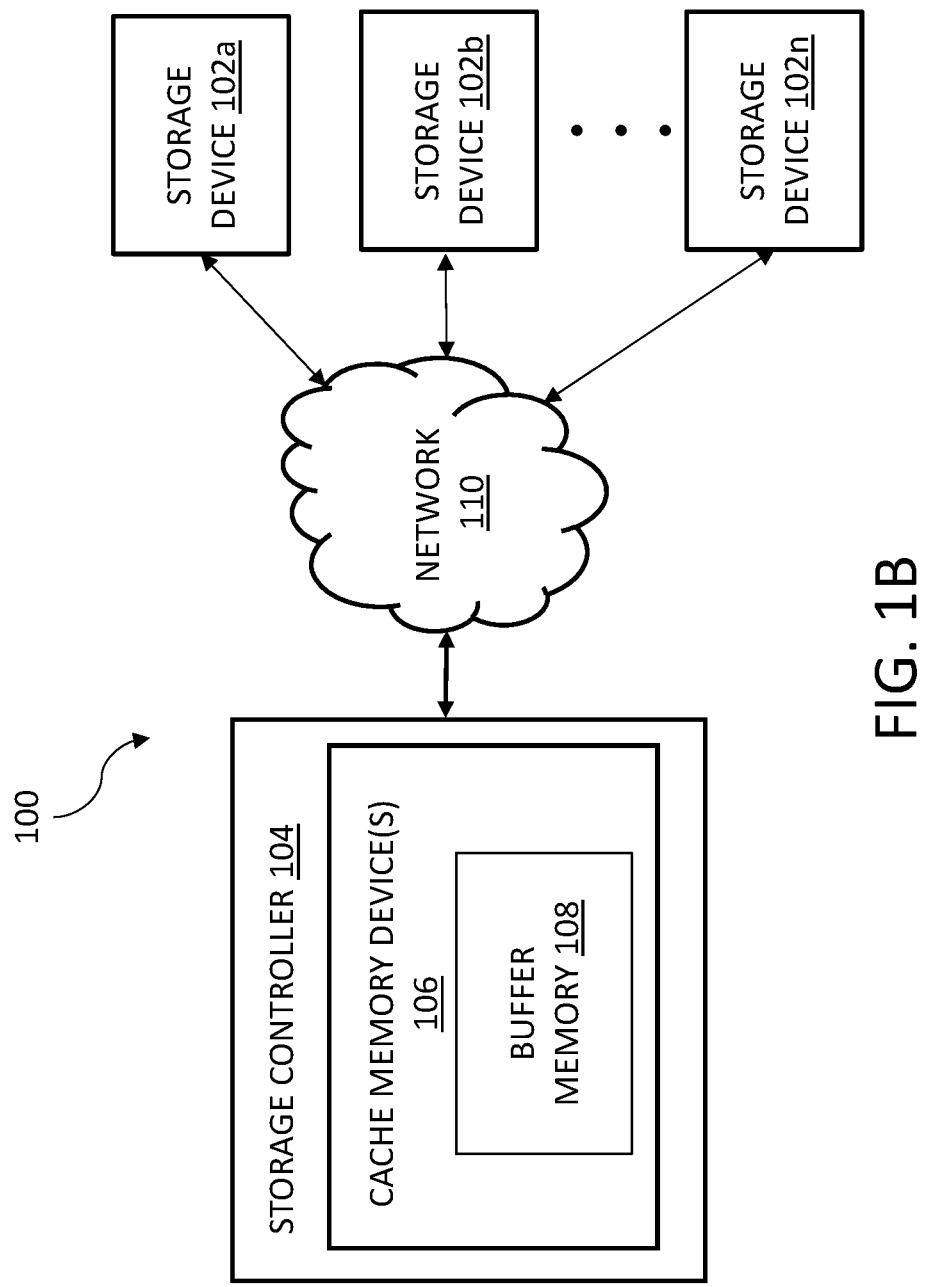
FIG. 1B is a diagram of an example storage system included in the computing network of FIG. 1A.

The innovative technology disclosed herein includes various aspects, such as systems, methods, apparatuses, computer-readable media, computer program products, etc., for managing input/output (I/O) operations for data objects, particularly large data objects, in a storage system. The technology is advantageously more efficient and/or more reliable than previous computing networks and/or networks utilized to store data and, particularly, utilized to store data objects, especially when the data objects include large amounts of data (are large data objects (LOBs)). A LOB includes a quantity of data or an amount of data greater than a temporary non-transitory storage medium of a storage device, as discussed in further detail below.

The various embodiments disclosed below include hardware and/or software to advantageously increase network and system reliability and/or decrease latency issues associated with writing large data objects (e.g., data objects including a size greater than the size or storage capacity of the buffer memory) to long-term storage. Furthermore, the various embodiments disclosed herein include hardware and/or software to avoid or at least decrease latency issues associated with requests (e.g., read requests) to read data (e.g., data objects) from long-term storage and/or associated with requests (e.g., read-write requests) to modify data (e.g., data objects) in long-term storage.

Turning now to the drawings, FIG. 1A is a block diagram of an example storage network 10. As shown, storage network 10 can include multiple client devices 25 capable of being coupled to and in communication with a storage system 100 via a wired and/or wireless network 75 (e.g., public and/or private computer networks in any number and/or configuration (e.g., the Internet, an intranet, a cloud network, etc.)), among other examples that may include one client device 25 or two or more client devices 25 (e.g., is not limited to three client devices 25).

A client device 25 can be any computing hardware and/or software (e.g., a thick client, a thin client, or hybrid thereof) capable of accessing storage system 100 utilizing network 75. Each client device 25, as part of its respective operation, relies on sending input/output (I/O) requests to storage system 100 to write data, read data, and/or modify data. Specifically, each client device 25 can transmit I/O requests to read, write, store, communicate, propagate, and/or transport instructions, data, computer programs, software, code, routines, etc., to storage system 100. Client device(s) 25 and storage system 100 may comprise at least a portion of a client-server model. In general, storage system 100 can be accessed by client device(s) 25 and/or communication with storage system 100 can be initiated by client device(s) 25 through a network socket (not shown) utilizing one or more inter-process networking techniques.

With reference to FIG. 1B, a block diagram of an example storage system 100 is illustrated. As shown, storage system 100 may comprise, among other components, multiple storage devices 102a, 102b, . . . 102n and a storage controller 104 coupled to and in communication with storage devices 102a, 102b, . . . 102n via a wired and/or wireless network 110.

By utilizing network 110, storage system 100, in various embodiments, can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

Storage devices 102a, 102b, . . . 102n (also simply referred individually, in various groups, or collectively as storage device(s) 102) may each be any type of storage device that is known or developed in the future and is capable of storing data and/or data objects. In various embodiments, a storage device 102 may include one or more non-transitory computer-usable (e.g., readable, writable, etc.) mediums, which may include any non-transitory and/or persistent apparatus or device that can contain, store, communicate, propagate, and/or transport instructions, data, computer programs, software, code, routines, etc., for processing by or in connection with a computer processing device.

As shown in FIG. 1B, storage devices 102a, 102b, . . . 102n can be implemented as flash memory (e.g., a solid-state devices (SSD) or other non-volatile storage device that stores persistent data or persistent storage device). In further embodiments, storage devices 102a, 102b, . . . 102n may include non-transitory memory such as, for example, a dynamic random access memory (DRAM) device, a static random access memory (SRAM) device, a hard disk drive (HDD), and/or storage tape (e.g., magnetic and/or virtual), among other types (e.g., non-volatile and/or persistent) of memory devices.

In various embodiments, one or more of storage devices 102a, 102b, . . . 102n can include non-volatile/persistent hardware and/or software configured for performing long-term data storage operations (e.g., data archiving, data back-up, data mirroring, replicating data, etc.). For instance, each of storage devices 102a, 102b, . . . 102n may include non-volatile and/or persistent hardware and/or software configured for performing long-term data storage operations. Further, a storage device 102 may include hardware and/or software that functions to store data and/or one or more data objects as a single entry (e.g., when the size of the data object is less than or equal to the buffer size of a cache memory device 106 (e.g., the size of a buffer memory 108)).

Alternatively or additionally, a storage device 102 may include hardware and/or software to store one or more data objects divided/partitioned into multiple data chunks (e.g., a plurality of data chunks or two or more data chunks). Example data objects (and data chunks) include, but are not limited to, a group/grouping of data, a sequence of data, a data table, an index, a procedure, a routine, a view, a snapshot, and/or the like contents/classes of data.

In some embodiments, a storage device 102 may comprise at least a portion of an object storage system. In various embodiments, a storage device 102 can include hardware and/or software to store data objects (e.g., data files) in containers that are organizationally flat (e.g., non-hierarchical), and can use unique identifiers (IDs) to retrieve the data objects. In various embodiments, a storage device 102 may use metadata to store and access data objects and store the metadata with its corresponding data object. Accordingly, in various embodiments, one or more additional storage devices 102 may be added, as desired, to storage system 100 without materially increasing processing overhead, which can provide scalability to storage system 100.

A data object may have any size capable of being stored in a storage device 102. Data objects stored in a storage device 102 may include the same predetermined size, different sizes, or a combination of the foregoing. In one example, a data object can have a size of about two or more terabytes (2 TB) of data, although other sizes greater than or less than 2 TB of data are also applicable. A data object may have a size (include a quantity of data) that exceeds the buffer size, which may reflect the amount of available memory/storage space in cache memory device 106 and/or buffer memory 108 (e.g., data object size>buffer size), in which case it is considered a LOB. A LOB may be stored in an inode.

An inode has a data structure that stores a data object and one or more data chunks corresponding to the data object. A data chunk is a constituent portion or partition of the data object. An inode that stores a LOB may be referred to herein as a non-conforming inode. When storing or retrieving the LOB in or from a storage device 102, the LOB in each non-conforming inode may be divided (or partitioned) into two or more data chunks. For example, one or more data chunks of a particular non-conforming inode may be stored in storage device 102a and one or more data chunks of the same non-conforming inode may be stored in storage device 102b, among other examples of data chunk distribution among storage devices 102a, 102b, . . . 102n.

A data object may be divided into any desired number of data chunks. In some embodiments, a data object may include the same number (or quantity) of data chunks, while in other embodiments two or more data objects can include different quantities of data chunks. In an example, a data object may include up to about ten thousand (10,000) data chunks (e.g., a number/quantity of data chunks in the range of 1 data chunk to 10,000 data chunks), among other example ranges and/or quantities of data chunks.

A data chunk may have any size suitable for long-term or non-volatile storage in a storage device 102 and storage in cache memory device 106, which is discussed further below. In some embodiments, two or more data chunks have the same or substantially same size. For instance, two or more data chunks may include the same quantity of bytes or substantially the same quantity or bytes (e.g., within 90% or more of one another). In further embodiments, two or more data chunks may have different sizes (e.g., include different quantities of data or differing amounts of data). In some embodiments, a first data chunk and a last data chunk in a data object may have different sizes than the other data chunks in the data object, which may further include the same size or different sizes with respect to one another.

In a further example, each data chunk may include about two hundred megabytes (200 MB) of data (e.g., a size of about 200 MB±0-10%), among other data chunk examples that may include greater than or less than about 200 MB of data; and each data object may include about 2 TB of data (e.g., is about a 2 TB data object ±0-10%) that is divided into 10,000 data chunks, each of which includes about 200 MB of data. Further, the first and last data chunks (e.g., data chunks 00001 and 10000) may include different sizes than the other data chunks (e.g., the other 9,998 data chunks may include about 200 MB of data, while data chunks 00001 and 10000 may include less than or greater than about 200 MB).

An inode for a data object may be assigned a unique object identifier, which may include any quantity and/or combination of alpha-numeric characters and/or digits. Each unique object identifier may be randomly assigned or may be assigned in a predetermined manner or order. In some embodiments, a data object may include a unique object identifier (e.g., DataObject ID) having twenty-five (25) alpha-numeric digits, among other example quantities of alpha-numeric digits that may be greater than or less than twenty-five (25) alpha-numeric digits. One particular example of a DataObject ID including twenty-five (25) alpha-numeric digits may be: 1234567890123456789012345 (i.e., twenty-five (25) numeric digits in this example), or other example combinations of alphabetic characters and/or numeric characters (or numerals).

Particular data objects that include a quantity of data or an amount of data (e.g., a data object size) that is less than or equal to the buffer size or amount of memory/storage space in cache memory device 106 and/or buffer memory 108 (e.g., data object size<buffer size) are referred to as conforming data objects. A conforming data object may be provided in an inode referred to as a conforming inode. A conforming inode may be assigned a unique object identifier and a representation of the data (e.g., metadata) in the data object. An example unique object identifier (e.g., DataObject ID) for a conforming inode may be: 2345678901234567890123456-<metadata>, wherein the inclusion of <metadata> in this example is a symbolic representation of the actual metadata for the data of an actual conforming inode.

A data chunk may include a unique data chunk identifier, which may include any quantity and/or combination of alpha-numeric characters/digits. Each unique data chunk identifier may be randomly assigned or may be assigned in a predetermined manner or order. In some embodiments, a unique data chunk identifier (e.g., DataChunk ID) may include a portion that identifies a corresponding data object (e.g., 1234567890123456789012345 in the above example), a portion (e.g., a set of alpha-numeric characters/digits) that identifies a particular data chunk (e.g., 00001 through 10000), and a portion of metadata representing/describing the data in the data chunk (e.g., represented by <metadata>), which can be generalized as: <DataObject ID>-<DataChunk ID>-<metadata>. Accordingly, each data chunk for a particular data object will have the same prefix (i.e., the DataObject ID) and a different postfix (i.e., DataChunk ID and metadata). An example of three consecutive data chunks may have the following DataChunk IDs:

1234567890123456789012345-00001-<metadata>;
1234567890123456789012345-00002-<metadata>; and
1234567890123456789012345-00003-<metadata>, with the metadata of the data in each data chunk represented by <metadata> subsequent to the DataChunk ID in these examples. As such, storage devices 102a, 102b, . . . 102n may store conforming data objects as a whole and/or LOBs divided into multiple data chunks.

As shown, storage controller 104 may comprise, among other components, one or more cache memory devices 106 that may include, among other components, a buffer memory 108. Each cache memory device 106 can be referred to individually, in various groups, or collectively as cache memory device(s) 106. A cache memory device 106 may be any type of hardware and/or software memory device that is known or developed in the future and is capable of storing one or more data objects and/or data chunks for retrieval when an I/O request (e.g., write request, read request, and/or read-write request, etc.) is received at storage system 100.

A cache memory device 106 may respond with a write-through acknowledgement or a write-back acknowledgement for a write request. For write-through acknowledgement configurations, a cache memory device 106 may write a data object or data chunk to buffer memory 108, write the data object or data chunk to one or more of storage devices 102a, storage device 102b, . . . storage device 102n, and acknowledge the write request after the data object or data chunk resides on storage device(s) 102.

For write-back acknowledgement configurations, a cache memory device 106 may acknowledge a write request as the data object or data chunk is stored (e.g., buffered, held, etc.) in buffer memory 108. A write-back acknowledgement configuration may allow a cache memory device 106 to buffer data objects and/or data chunks rapidly and then write the data objects and/or data chunks to relatively slower long-term storage device(s) (e.g., one or more of storage devices 102a, 102b, . . . 102n) when the long-term storage device(s) has/have bandwidth to perform I/O operations (e.g., read operations, write operations, and/or read-write operations, etc.).

A cache memory device 106 may perform read requests by providing one or more data objects and/or one or more data chunks to its buffer memory 108 for storage. For instance, cache memory device 106 may be configured to store (hold, buffer, accommodate, etc.) data objects and/or data chunks that have been previously written and/or read. This may be performed, in some cases, regardless of any pre-fetching activities storage controller 104 may have performed (e.g., read-ahead operations, as discussed elsewhere herein).

In various embodiments, a cache memory device 106 may store data objects and/or data chunks in its buffer memory 108 in accordance with a least recently used (LRU) technique. An example LRU technique removes/deletes older data objects and/or data chunks from buffer memory 108 to free up storage/buffer space in buffer memory 108 and populates the freed-up storage space with newly accessed data object(s) and/or data chunk(s). In other words, storage controller 104 may buffer each data object or each data chunk of a data object (e.g., a sequence of data chunks) as the data object(s) and/or data chunk(s) are accessed to fill available storage space in a buffer memory 108 of a cache memory device 106. Other techniques and variations are also possible and contemplated.

A cache memory device 106 may anticipate one or more future read requests (e.g., from one or more of clients 50) and store one or more data objects and/or data chunks in buffer memory 108 that may correspond to the read request(s) prior to receipt of the anticipated read request(s), which can be referred to as read-ahead functionality. In some embodiments, a cache memory device 106 may attempt to predict a particular set of data objects or a particular set of data chunk based on one or more previously received I/O requests. For example, a cache memory device 106 may predict that the next I/O request will be a read request to read a data chunk including the DataChunk ID 12345678901234567890012345-00004-< > because the three previous I/O requests were read requests to read data chunks including DataChunk IDs 12345678901234567890012345-00001-< >, 12345678901234567890012345-00002-< >, and 12345678901234567890012345-00003-< >, in succession.

The efficiency and extent to which a storage system may perform may be a function of the amount of memory in its cache memory device (e.g., buffer size). That is, larger cache memory devices may include a large buffer memory that can buffer more data objects and/or data chunks, which often results in better performance (e.g., as measured in I/O operations per second (IOPS), throughput, etc.). The storage technology disclosed herein advantageously addresses situations in which I/O requests correspond to LOBs, situations in which the cache memory device is full or substantially full (e.g., stores an amount of data above the predetermined threshold amount of data), and/or situations in which the cache memory device does not store desired data (e.g., one or more data objects and/or one or more data chunks).

In various embodiments, storage controller 104 may be coupled between client device(s) 25 and cache memory device(s) 106. Further, storage controller 104 may include hardware or a combination of hardware/software that can determine the size (e.g., buffer size) of an associated cache memory device (e.g., cache memory device(s) 106 and/or one or more buffer memories 108) and receive I/O requests (e.g., write requests, read requests, and read-write requests) from one or more client devices (e.g., client devices 25) via a network (e.g., network 75). Storage controller 104, in some embodiments, can determine the size of a data object (e.g., the data object size) upon receipt of an I/O request to write (e.g., a write request) the data object to long-term storage (e.g., storage devices 102a, 102b, ... 102n) and compare the data object size to the buffer size of a buffer memory 108 in a cache memory device 106.

Storage controller 104 may assign conforming data objects and non-conforming data objects (LOBs) with data object identifiers. Storage controller 104 may write conforming data objects, as a whole, to a cache memory device 106 and may write LOBs by dividing the LOBs into data chunks or partitions, as discussed elsewhere herein. For example, storage controller 104 may assign a conforming data object 23456789012345678901123456-< > as its DataObject ID, may assign no DataChunk IDs, and may include metadata in the postfix.

In various embodiments, storage controller 104 may organize data objects in a directory structure based on the unique object identifiers assigned to them. A directory structure may include any number of levels or structure suitable for locating the data object(s). In an example, data objects may be organized in a three-level directory based on the unique object identifier, among other examples implementing a fewer number of levels or a greater number of levels in a directory structure. For instance, the first set of three numbers (e.g., [123]), the second set of three numbers (e.g., [456]), and the third set of three numbers (e.g., [789]) may define the first level, second level, and third level, respectively, of the directory with the remaining numbers (e.g., sixteen (16) numbers (e.g., 0123456789012345)) providing identification of a specific data object in the directory. Accordingly, the DataObject ID for this particular instance may be: [123] [456] [789] 0123456789012345. As such, each data chunk created for this particular data object may be located in a directory addressed as: /mnt/ssd/123/456/789/.

A data chunk in a given divided/partitioned data object may include a unique object identifier, such as a DataChunk ID, which may include any quantity and/or combination of alpha-numeric and/or other type of symbols and further includes metadata, as discussed above. For example, a fifth data chunk in particular data object may be assigned 00005-< > as its DataChunk ID, with 00005 as its DataChunk ID (e.g., 00001-00004 already being in use or assigned) and metadata in the postfix, which is represented by < > in the DataObject ID of this example. Accordingly, the DataChunk ID for this particular data chunk would be 12345678901234567890012345-00005-<metadata> for a data object assigned the DataObject ID 12345678901234567890012345, with the actual metadata replacing the symbolic metadata in this example.

In various embodiments, storage controller 104 may write each data chunk of a data object received from a client device (e.g., client device 25) to a buffer memory 108 of a cache memory device 106. Storage controller 104, in some embodiments, may continue to write data chunks to a buffer memory 108 until a storage threshold of a cache memory device 106 has been met. For instance, the storage threshold may reflect that an aspect of a buffer memory 108 is full, which may mean that data chunks are written to the buffer memory 108 until the storage capacity of the buffer memory 108 has been met, a predetermined threshold of memory space in the buffer memory 108 is being utilized (e.g., eighty percent (80%), among other example threshold values that may be greater than or less than 80%), a pre-allocated storage capacity has been met for the storage of that type of data object, etc., among other examples.

A LRU technique may be included in various embodiments of storage controller 104 to reduce storage constraints in a buffer memory 108. For instance, storage controller 104 may begin writing data chunks stored in a cache memory device 106 (e.g., its buffer memory 108) for the longest amount of time (e.g., LRU or accessed) to one of storage devices 102 to free memory space (e.g., make available) in a buffer memory 108 so that the remaining data chunks in the data object can be written to a cache memory device 106.

Storage controller 104, in various embodiments, may write or continue writing data chunks to cache memory device(s) 106 as memory space is made available in their respective buffer memory 108 via the LRU technique. Writing data chunks (e.g., LRU data chunks) to one or more of the storage devices 102 to free memory space as memory space becomes available, in various embodiments, may be referred to as a push for each data chunk or pushing the data chunks (or the non-conforming inode) through cache memory device 106 to long-term storage (e.g., one or more of storage device 102a, 102b, ... 102n). For instance, storage controller 104 may push a data chunk in the non-conforming inode through cache memory device 106 to long-term storage until the entire data object (i.e., each and every data chunk) is written to (e.g., buffered/stored in) storage system 100 (e.g., cache memory device 106 (e.g., buffer memory 108) and/or one or more of the storage devices 102). The pushing operations may be periodically (e.g., at predetermined intervals), substantially continuously, and/or continuously performed by storage controller 104 until there are no remaining data chunks in the non-conforming inode that are to be written to storage system 100.

In this manner, storage controller 104 may, in some cases, write data objects (e.g., non-conforming inodes) to storage system 100 by pushing smaller amounts of a data object (e.g., in the form of two or more data chunks) through a cache memory device 106 (e.g., buffer memory 108) to long-term storage (e.g., one or more of the storage devices 102) instead of writing the entire data object to storage system 100 at a single instance.

Writing (or pushing) data chunks in a data object through cache memory device(s) 106 to one or more of the storage devices 102 is more efficient than other approaches, such as those that write the entire data object to a storage buffer at a single point in time. For instance, pushing data chunks through to long-term memory is advantageously faster, uses less overhead, needs less bandwidth, etc. than writing an entire LOB in a single operation, especially for non-conforming inodes whose size exceeds available buffer space, because writing smaller data chunks in a series of writes can allow a buffer memory 108 to have sufficient storage space over time to accommodate each individual data chunk. In other words, pushing through data chunks of a LOB may be considered an added time variable of some write operations of cache memory device 106 that can allow cache memory device 106 to more efficiently and/or reliably write and/or buffer LOBs.

In various embodiments, storage controller 104 may perform or execute I/O requests to read data objects from one or more storage devices 102 to cache memory device 106 (e.g., buffer memory 108). In some embodiments, an entire data object (e.g., a conforming inode) may be read to cache memory device 106 (e.g., buffer memory 108) when data within the non-conforming inode is read requested. In some embodiments, a subset (e.g., one or more data chunks, one or more portions, one or more partitions, etc.) of a data object (e.g., a conforming inode and/or a non-conforming inode) including the desired data may be read to cache memory device 106 from one or more of storage devices 102 when data of a conforming inode or a non-conforming inode is read requested. In various embodiments, storage controller 104 may identify the data chunk(s) stored in one or more of storage devices 102 including the desired data in a read request and reads the identified data chunk(s) from one or more storage device(s) 102 to cache memory device 106.

Similar to various embodiments discussed above, storage controller 104 may implement the LRU technique described herein, as needed, to free memory space in cache memory device 106 when buffer memory 108 is full when servicing a read request, which may mean that the storage capacity of buffer memory 108 has been met, a predetermined threshold of memory space in buffer memory 108 is being utilized (e.g., eighty percent (80%), among other example threshold values that may be greater than or less than 80%), a pre-allocated storage capacity has been met for the storage of a type of data object, etc. Storage controller 104 may recognize that buffer memory 108 is full and, in response to such recognition, begin removing/deleting one or more data objects and/or one or more data chunks from buffer memory 108 in accordance with the LRU technique.

In some embodiments, storage controller 104 may determine whether data object(s) and/or data chunk(s) that is/are subject to removal from buffer memory 108 of cache memory device 106 in accordance with the LRU technique are written to/stored in long-term storage (e.g., one or more of storage devices 102a, 102b, . . . 102n). The storage controller 104 may write data objects and/or data chunks subject to removal from buffer memory 108 to storage devices 102 prior to the data object(s) and/or data chunk(s) being removed/deleted from buffer memory 108, which may further include the data object(s) and/or data chunk(s) being mirrored/replicated in another one or more of storage devices 102 consistent with the discussion below.

In some embodiments, storage controller 104 may utilize smaller amounts of data in the form of one or more data chunks to read or pull a subset of data (e.g., desired data) in a data object that is stored in one or more of storage devices 102 to buffer memory 108 instead of reading the entire data object from storage device(s) 102 to buffer memory 108. Reading (or pulling) a subset of a data object (e.g., one or more data chunks) from one or more of storage devices 102a, 102b, . . . 102n to buffer memory 108 may advantageously be more efficient than reading the entire data object from storage device(s) 102a, 102b, . . . 102n to buffer memory 108, especially when the desired data is located in a non-conforming inode, because reading a subset of a data object (e.g., a smaller amount/quantity of data in the form of one or more data chunks) to buffer memory 108 is faster, uses less buffer memory overhead, and/or needs less bandwidth to communicate/transfer data, among other advantages, than other storage solutions or services that attempt to read all of the data in a data object to a storage buffer of cache, as discussed in the Background.

In various embodiments, storage controller 104 includes functionality to perform or execute I/O requests to modify data objects (e.g., conforming inodes and/or non-conforming inodes) from one or more of storage devices 102 via cache memory device 106. In some embodiments, an entire data object may be read to cache memory device 106 and modified when data within the non-conforming inode is read-write requested.

The storage controller 104 may further re-write modified/re-written data object in cache memory devices 106 to one or more of storage devices 102, which may replace the original data object in storage device(s) 102 with the modified data object. The modified/re-written data object may then be mirrored/replicated in another one or more of storage devices 102 consistent with the discussion below.

In other embodiments, a subset of a data object including data desiring modification may be read to cache memory device(s) 106 from one or more of storage devices 102 and modified/re-written when data of a conforming inode or a non-conforming inode is read-write requested. In various embodiments, storage controller 104 may identify the data chunk(s) stored in storage devices 102, including the data for which modification is desired in a modification request (e.g., read-write request). The identified data chunk(s) may be read (e.g., from storage device(s) 102 to cache memory device(s) 106 and subsequently modified/re-written.

Similar to various embodiments discussed above, storage controller 104 may implement the LRU technique, as needed, to free memory space in cache memory device 106 when buffer memory 108 is full. For instance, storage controller 104 may recognize that buffer memory 108 is full may begin removing one or more data objects and/or one or more data chunks from buffer memory 108 in accordance with the LRU technique, as discussed elsewhere herein.

In some embodiments, storage controller 104 may determine whether the data object(s) and/or data chunk(s) that is/are subject to removal from cache memory devices 106 in accordance with the LRU technique are written to/stored in storage devices 102. For instance, storage controller 104 may write the data object(s) and/or data chunk(s) that is/are subject to removal from a buffer memory 108 to storage device(s) 102 prior to the data object(s) and/or data chunk(s) being removed from the buffer memory 108, which may further include the data object(s) and/or data chunk(s) being mirrored/replicated in storage devices 102, as discussed elsewhere herein.

Storage controller 104, in some embodiments, may further write (or re-write) modified/re-written data objects and/or data chunks to storage devices 102 subsequent to being modified/re-written in cache memory device(s) 106. In various embodiments, storage controller 104 may synchronously or asynchronously write/re-write the modified/re-written data objects and/or data chunks to storage devices 102, as discussed elsewhere herein.

In this manner, storage controller 104 may utilize one or more data chunks to read-write (pull-push) a subset of data desiring modification in a data object that is stored in storage devices 102 instead of the technique in other storage solutions or services that read the entire data object and then write/re-write a subset or small portion of the data in the data object. As such, storage controller 104 may advantageously be faster, use less buffer memory overhead, needs less bandwidth, etc., among other advantages, than other storage solutions or services, as discussed in the Background.

Storage controller 104 may include interface(s) for receiving requests to perform a process or method to manage storage operations in a storage system (e.g., storage system 100). In various embodiments, the storage operations are managed utilizing an application program interface (API) for one or more of cache memory devices 106, which may be referred to herein as a cache API. The functionality of storage controller 104, in some embodiments, may provide multiple threads (e.g., a plurality of threads, two or more threads, etc.) or a thread pool configured to perform the I/O operations (e.g., write requests, read requests, and/or read-write requests) discussed above. As such, storage controller 104 may be referred to as a multi-threaded storage controller in some embodiments. In some embodiments, storage controller 104 may define the configuration (e.g., task and/or operation) of each thread and multiple threads may be started at the instantiation of cache memory device 106.

Storage controller 104 also includes functionality to create a cache entry object (e.g., a CacheEntry object) for each data object received at cache memory device 106 (e.g., received from a client (e.g., client devices 50)). The statement, CacheEntry* Create( . . . ) is example code that may be utilized by storage controller 104 to create a CacheEntry object. The " . . . " in the parenthetical of this example may be replaced by a representation of a data object (e.g., a DataObject ID) in an actual cache entry object. For example, a cache entry object for a data object with a DataObject ID 12345678901234567890012345 may be created with the statement, CacheEntry* Create (DataObject ID 12345678901234567890012345) or similar coding logic that assigns a cache entry object to a data object implemented in a different computing language. As such, each data object is assigned at least a CacheEntry ID and a DataObject ID (e.g., is assigned at least two IDs).

Storage controller 104 may assign a particular thread to a particular cache entry object using a round-robin technique, among other example assigning techniques or methods. Further, storage controller 104 may assign a different thread to manage each respective cache entry object such that there is a 1:1 ratio of threads to cache entry objects.

A thread functions to manage I/O operations for its assigned cache entry object. That is, a thread may receive I/O requests and, in response thereto, perform the I/O operations in the I/O requests for its assigned cache entry object. A thread may receive write requests, read requests, and read-write requests at its assigned cache entry object and, in response thereto, execute write operations, read operations, and read-write operations, respectively, on the data object coinciding with its cache entry object that are consistent with the respective write requests, read requests, and read-write requests. Examples of a write request, a read request, and a read-write request (e.g., I/O requests) can be, respectively, as follows:

Write(CacheEntry*,( . . . ));
Read(CacheEntry*,( . . . )); and
Read-write(CacheEntry*,( . . . )), in which the " . . . " in these example I/O operations represent the ID of an actual cache entry object (data object).

A thread may transmit an indication or acknowledgement that the I/O operation has been performed or is completed. Non-limiting examples of an indication or acknowledgement that an I/O operation has been performed or is complete are: a WriteDone acknowledgement, a ReadDone acknowledgement, and a Read-writeDone acknowledgement for a write operation, a read operation, and a read-write operation, respectively.

A thread can manage the data chunks corresponding to or associated with its assigned cache entry object (or data object), if any. That is, the same thread that manages a particular cache entry object (or data object) also manages any data chunks that are associated with or correspond to the particular data object. For example, the thread assigned to manage a cache entry object for a data object divided into 10,000 data chunks (e.g., data chunks 00001-10000) and includes the DataObject ID 12345678901234567890012345 also manages the data chunks corresponding to the data object (e.g., the data chunks assigned DataChunk IDs 12345678901234567890012345-00001-<metadata> through 12345678901234567890012345-10000-<metadata>). In this manner, storage controller 104 and/or the multiple threads are able to avoid or at least reduce one or more concurrency penalties that may occur when the threads are performing their various respective operations or tasks.

In some embodiments, storage controller 104 may utilize pointers to the cache entry objects to post I/O operations for the threads assigned to the cache entry objects. A pointer may be used to post each write request, read request, and read-write request to the thread assigned to a particular cache entry object so that the thread can, in response thereto, perform each write operation, read operation, or read-write operation consistent with the various discussions above.

In various embodiments, storage controller 104 may be configured for redundancy to provide that data objects and/or data chunks may be stored in two or more locations in cache memory devices 106. The data objects and/or data chunks may be synchronously or asynchronously copied across one or more of cache memory devices 106 using any suitable redundancy and/or replication technique/process that is known or developed in the future. Non-limiting examples of such replication techniques may include or be referred to as: data duplication, copying data, data replication, backing-up data, and data mirroring, among other example replication techniques. The data objects and/or data chunks may be replicated in the same cache memory device 106 and/or across two or more cache memory devices 106.

Storage controller 104 may be further configured for replicating the data objects and/or data chunks across one or more of storage devices 102a, 102b, . . . 102n. The data objects and/or data chunks may be synchronously or asynchronously copied to one or more of storage devices 102 using any suitable technique that is known or developed in the future, as discussed above. The data objects and/or data chunks may be replicated in the same storage device 102 and/or across two or more storage devices 102.

Figure 2:
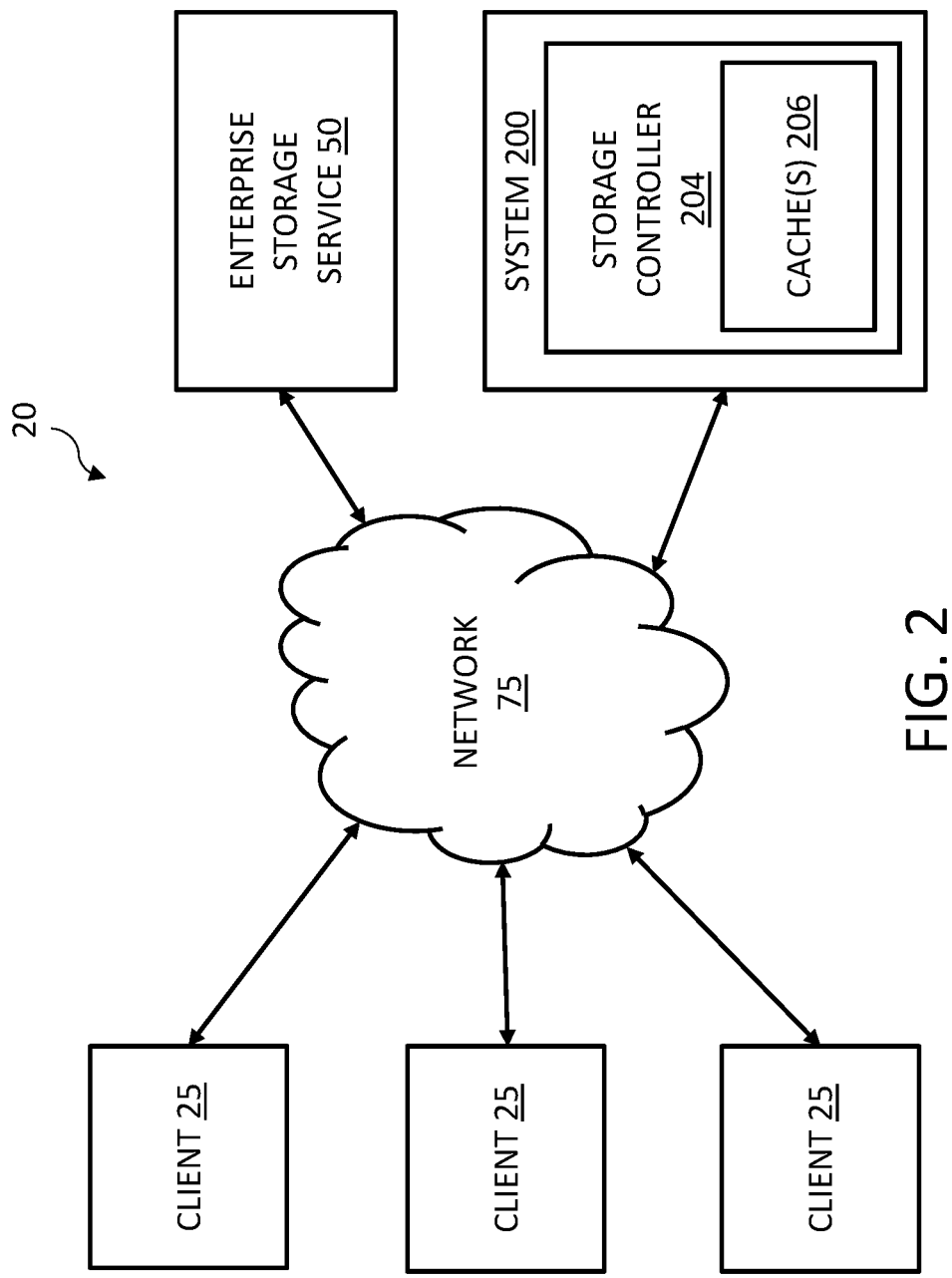
FIG. 2 is a diagram of an example computing network for storing data.

FIG. 2 is a block diagram of an example storage network 20 including, among other components, one or more client devices 25 and an enterprise storage service 50 capable of being coupled to and in communication with a storage system 200 via a wired and/or wireless network 75. Each client device 25 can be any computing hardware and/or software (e.g., a thick client, a thin client, or hybrid thereof) capable of accessing storage system 200 utilizing network 75. A client device 25, as part of its respective operation, may send I/O requests to storage system 200. For instance, a client device 25 can transmit I/O requests to read, write, store, communicate, propagate, and/or transport instructions, data, computer programs, software, code, routines, etc., to storage system 200. Client device(s) 25 and storage system 200 may comprise at least a portion of a client-server model. In general, storage system 200 may be accessed by client device(s) 25 and/or communication with storage system 200 may be initiated by client device(s) 25 through a network socket utilizing one or more inter-process networking techniques.

Enterprise storage service 50 may include any suitable storage service and/or storage network that is known or developed in the future. An example enterprise storage service 50 is the Simple Storage Service (S3) provided by Amazon® Web Services, among other examples of an enterprise storage services. In various embodiments, enterprise storage service 50 may provide a storage system that stores data objects, which can be referred to an object storage system. Enterprise storage service 50 may, in some embodiments, store data objects in a flat organization (e.g., non-hierarchical) of containers or buckets and may use unique IDs or keys to retrieve the data objects, although other variations are also possible and contemplated. Enterprise storage service 50, in various embodiments, may include any number of storage devices. The storage devices may, in some embodiments, use metadata to store and access data objects and store the metadata with its corresponding data object similar to storage devices 102a, 102b, . . . 102n discussed above. Accordingly, enterprise storage service 50 may function and/or operate in a manner similar to storage devices 102 discussed above and may be applicable to network 20 and/or storage system 200.

As shown, storage system 200 may comprise, among other components, a storage controller 204 including one or more cache memory devices 206 similar to storage controller 104 and cache memory device(s) 106, respectively, in storage system 100, although other suitable configurations are also applicable and contemplated. Storage controller 204 and cache memory device(s) 206 are capable of being coupled to and in communication with client device(s) 25 and enterprise storage service 50 via network 75. In various embodiments, storage controller 204 may be coupled between client device(s) 25 and cache memory device(s) 206.

Network 75, in various embodiments, may comprise any type of computing network(s) that are known or developed in the future that may allow client devices 25, enterprise storage service 50, and storage system 200 to communicate and/or share resources with one another. Non-limiting examples of a network include, but are not limited to, a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

The various embodiments of network 20 may include hardware and/or software that allow network 20 to operate in a manner similar to network 10 discussed above with reference to FIGS. 1A and 1B. Additionally, in network 20 a third-party storage service (e.g., enterprise storage service 50 may provide long-term storage operations and data replication of data objects and/or data chunks. Further implementations may include a combination of network 20 and network 10, and/or aspects thereof, such as a network including one or more third-party storage services and one or more local or remote storage devices, each providing long-term storage operations and data replication of data objects and/or data chunks.

In some embodiments, in network 10 and/or network 20, one or more of client devices 25 may be unaware of whether it/they are a part of network 10 or network 20. That is, the operations of storage system 100 and/or 200 may be unknown to or not seen by (transparent to) one or more of client devices 25, although in further implementations, some or all of client devices 25 may be aware of their membership in network 10 and/or network 20.

Figure 3A:
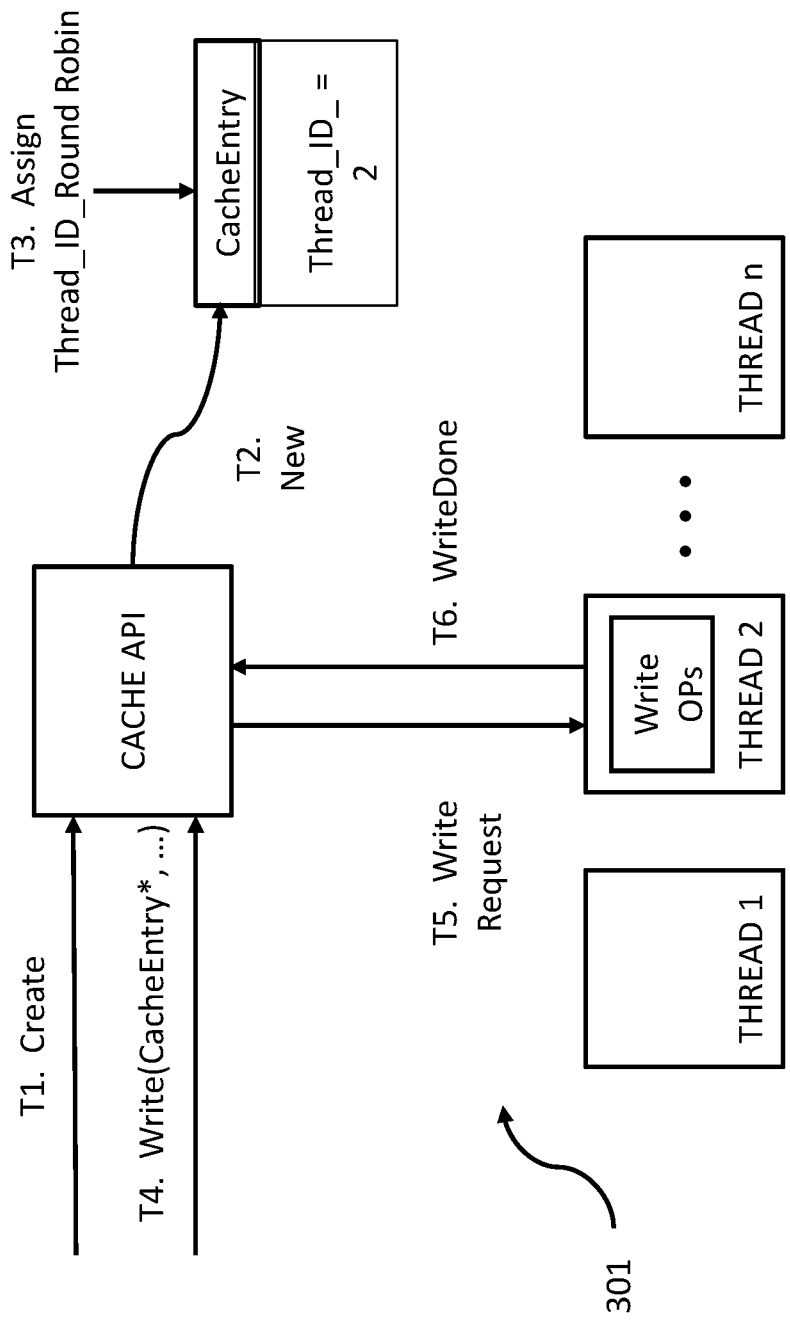
FIGS. 3A through 3C are flow diagrams illustrating various examples of input/output (I/O) operations performed for large data objects.
Figure 3B:
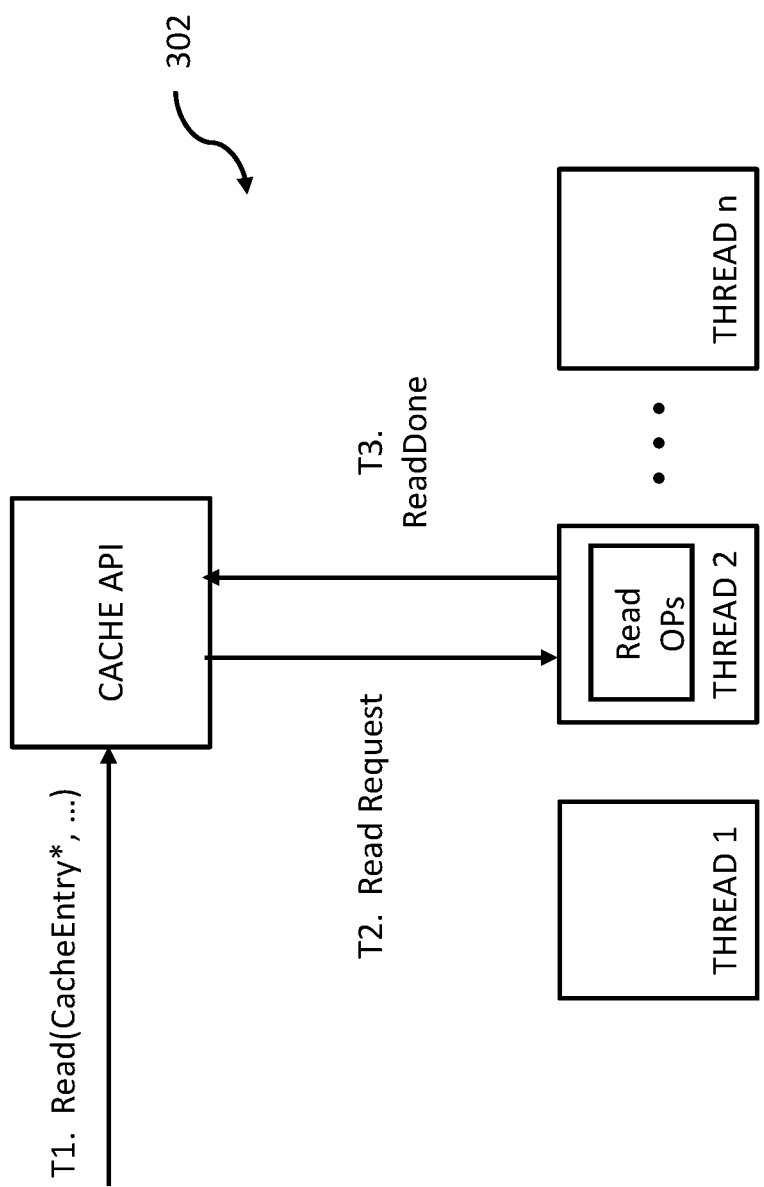
Figure 3C:
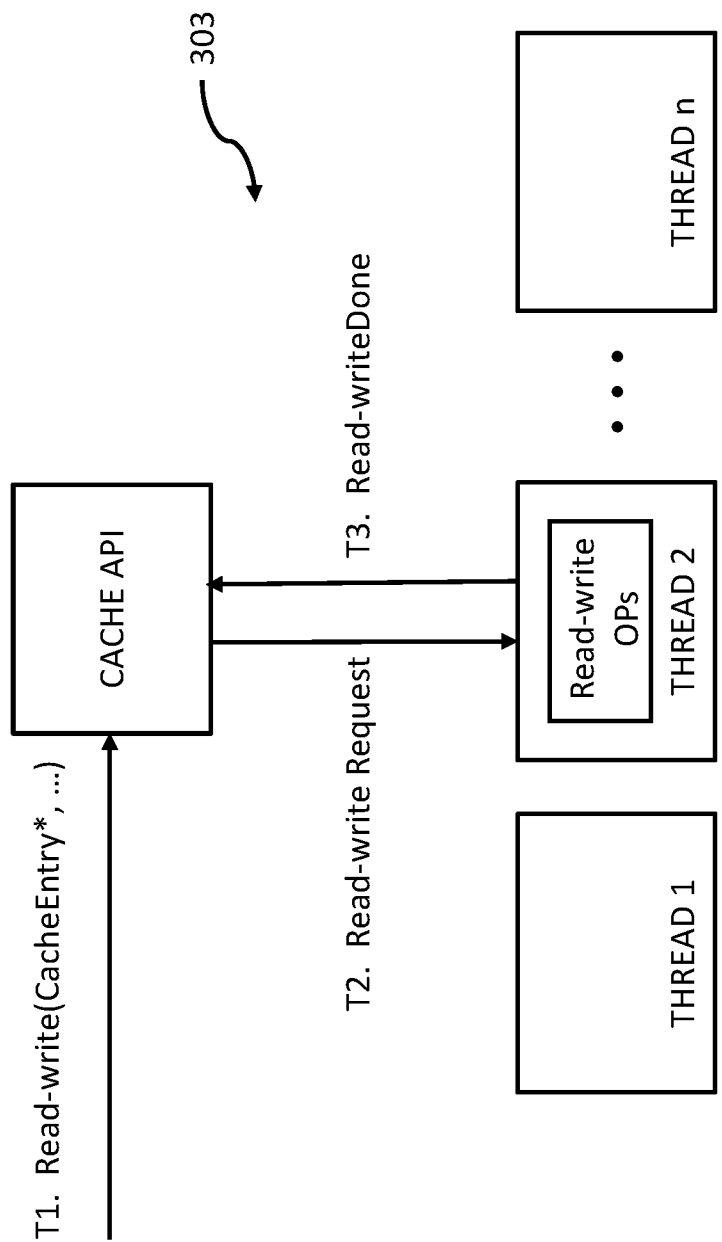

FIGS. 3A through 3C are a flow diagram of example operations for a storage controller (e.g., storage controller 104 and/or 204) to manage storage in accordance with various embodiments. At least in the illustrated embodiment, the operations 301 (e.g., write operations) may begin at time 1 (T1) with the creation of a data object ID and/or corresponding data chunk IDs (e.g., by storage controller 104 or 204 (e.g., via a cache API)) for a data object received (and divided/partitioned) at a storage system (e.g., storage system 100 or 200), which data object ID and/or data chunk IDs may be assigned in a manner consistent with the various discussions above. A new cache entry object (e.g., CacheEntry) corresponding to the data object and/or data chunks may be created (e.g., by storage controller 104 or 204 (e.g., via the cache API)) at time 2 (T2) in accordance with the various discussions above.

At time 3 (T3), a thread may be assigned (e.g., by storage controller 104 or 204 (e.g., via a cache API)) to the cache entry object. The assignment of the thread to the cache entry object may be the result of an assigning technique (e.g., a round-robin assigning technique, among other example assigning techniques). The thread functions to manage I/O operations for the cache entry object. That is, the thread can receive I/O requests (e.g., write requests, read requests, and read-write requests) and, in response to the I/O requests, may perform the I/O operations (e.g., write operations, read operations, and read-write operations) in the I/O requests.

At time 4 (T4), an I/O request (e.g., write request in this example) may be received (e.g., by storage controller 104 or 204 (e.g., via a cache API)) for a particular cache entry object (data object). The I/O request (e.g., the write request in this example) may be directed (e.g., via a pointer) to the thread assigned to the particular cache entry object (data object) and the assigned thread may perform the I/O operations (e.g., write operations in this example) on the cache entry object at time 5 (T5).

Upon completion of the I/O operations (e.g., write operations in this example), the thread may acknowledge (e.g., a WriteDone acknowledgement in this example) completion of the I/O request (e.g., write request in this example) to the storage controller (e.g., storage controller 104 or 204 (e.g., via a cache API)) at time 6 (T6).

In addition, the operations at time 1 through time 6 may be repeated for an I/O request received at the storage controller (e.g., storage controller 104 or 204) for each different (e.g., new) cache entry object (e.g., a different data object and/or different corresponding data chunks). The operations at time 4 through time 6 may be repeated for each I/O request received at the storage controller (e.g., storage controller 104 or 204) for the different cache entry object (e.g., different data object and/or different corresponding data chunks).

At time 4 (T4), an I/O request (e.g., write request in this example) may be received (e.g., by storage controller 104 or 204 (e.g., via a cache API)) for a particular cache entry object (data object). The I/O request (e.g., the write request in this example) may be directed (e.g., via a pointer) to the thread assigned to the particular cache entry object (data object) and the assigned thread may perform I/O operations (e.g., write operations in this example) on the cache entry object at time 5 (T5). Upon completion of the I/O operations (e.g., write operations in this example), the thread may acknowledge (e.g., a WriteDone acknowledgement in this example) completion of the I/O request (e.g., write request in this example) to the storage controller (e.g., storage controller 104 or 204 (e.g., via a cache API)) at time 6 (T6).

In addition, the operations at times 1 through 6 may be repeated for an I/O request received at the storage controller (e.g., storage controller 104 or 204) for each different (e.g., new) cache entry object (e.g., a different data object and/or different corresponding data chunks). Moreover, the operations at time 4 through time 6 may be repeated for each I/O request received at the storage controller (e.g., storage controller 104 or 204) for the different cache entry object (e.g., different data object and/or different corresponding data chunks).

In FIG. 3B, the operations 302 (e.g., read operations) may begin at time 1 (T1) with receipt (e.g., by storage controller 104 or 204 (e.g., via a cache API)) of an I/O request (e.g., read request in this example) for a particular cache entry object (data object). The I/O request (e.g., the read request in this example) may be directed (e.g., via a pointer) to the thread assigned to the particular cache entry object (data object) and the assigned thread may perform the I/O operations (e.g., read operations in this example) on the cache entry object at time 2 (T2).

Upon completion of the I/O operations (e.g., read operations in this example), the thread may acknowledge (e.g., a ReadDone acknowledgement in this example) completion of the I/O request (e.g., read request in this example) to the storage controller (e.g., storage controller 104 or 204 (e.g., via a cache API)) at time 3 (T3). The operations at times 1 through 3 may be repeated for each read request received at the storage controller (e.g., storage controller 104 or 204) subsequent to time 3.

In FIG. 3C, the operations 303 (e.g., read-write operations) may begin at time 1 (T1) with receipt (e.g., by storage controller 104 or 204 (e.g., via a cache API)) of an I/O request (e.g., read-write request in this example) to modify data for a particular cache entry object (data object). The I/O request (e.g., the read-write request in this example) may be directed (e.g., via a pointer) to the thread assigned to the particular cache entry object (data object) and the assigned thread may perform the I/O operations (e.g., read-write operations in this example) on the cache entry object at time 2 (T2).

Upon completion of the I/O operations (e.g., read-write operations in this example), the thread may acknowledge (e.g., a Read-writeDone acknowledgement in this example) completion of the I/O request (e.g., read-write request in this example) to the storage controller (e.g., storage controller 104 or 204 (e.g., via a cache API)) at time 3 (T3). The operations at times 1 through 3 may be repeated for each read-write request received at the storage controller (e.g., storage controller 104 or 204) subsequent to time 3.

In the examples of FIGS. 3A through 3C, upon completion of the I/O operations (e.g., write operations, read operations, read-write operations) discussed in each respective example, subsequent I/O requests may be performed by the threads (e.g., threads 1, 2, through n) consistent with FIGS. 3A through 3C. That is, subsequent to a thread acknowledgement (e.g., a WriteDone acknowledgement, a ReadDone acknowledgement, or a Read-writeDone acknowledgement) a next I/O request, which may be the same type of I/O request or a different type of I/O request, may be received by the storage controller and serviced by one of threads 1, 2, through n.

Figure 4:
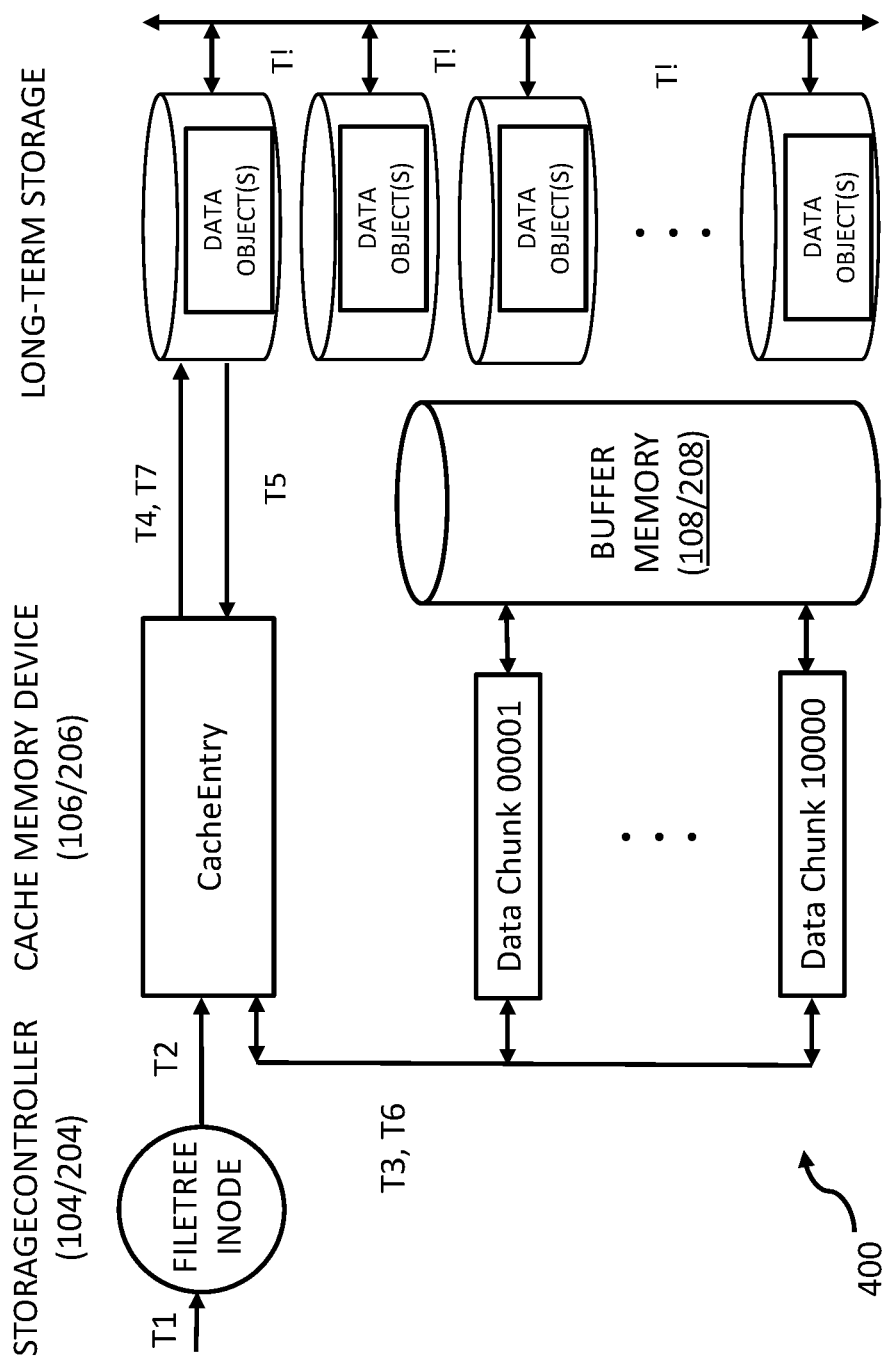
FIG. 4 is a diagram illustrating operations for various example hardware and/or software to write a data object to long-term storage.

With reference to FIG. 4, a diagram 400 representing example storage operations of a storage system (e.g., storage system 100 or 200) is illustrated. As shown, a newly received data object may be provided with an inode (e.g., a non-conforming inode or a conforming inode) that may be assigned (consistent with the various embodiments discussed above) with a DataObject ID at time 1 (T1). Time 1 may further include dividing each data object into multiple data chunks (e.g., a quantity of data chunks in the range of 1 data chunk to 10,000 data chunks, among other example ranges and/or quantities), each being assigned (consistent with the various embodiments discussed above) a respective data chunk ID. The inodes may be organized into a filetree including a hierarchical order (e.g., a multi-tiered or multi-level system (e.g., three levels) by the storage controller 104/204, consistent with the various embodiments discussed above).

At time 2 (T2), a cache entry object may be created (consistent with the various embodiments discussed above) for each inode in a cache memory device 106/206 such that each inode is associated with a corresponding cache entry object. In other words, each cache entry object may correspond to a different data object and its corresponding data chunks, if any.

Each data chunk may be written, at time 3 (T3), to a buffer memory 108/208 in the cache memory device 106/206 and subsequently written (e.g., stored), at time 4 (T4), in one or more storage devices and/or an enterprise storage service. In some embodiments, the write data chunks may be continuously transmitted to the buffer memory 108/208 until the buffer memory 108/208 is full or substantially full. After the buffer memory 108/208 is full, a LRU technique may be utilized to free space or make space in the buffer memory 108/208 so that the data chunks can continue being written to the buffer memory 108/208. That is, data chunks stored in the buffer memory 108/208 for the longest amount of time may be written to long-term storage and/or enterprise storage service 75, deleted from the buffer memory 108/208, and replaced in the buffer memory 108/208 by the remaining data chunk(s). The LRU technique may, in some cases, refrain from writing (or re-writing) data chunks to long-term storage prior to deleting/removing the data chunk(s) from the buffer memory 108/208 if the data chunk(s) are already written/re-written to (e.g., stored in) long-term storage (e.g., storage device(s) 102, enterprise storage service 50, etc.). In this manner, the data chunks may be pushed through the storage system (e.g., cache memory device) for long-term storage.

Data chunks may be read from long-term storage to the buffer memory 108/208 at time 5 (T5). In some embodiments, the write data chunks may be continuously read to the buffer memory until the buffer memory 108/208 is full. After the buffer memory 108/208 is full, the LRU technique may be utilized to free space or make space in the buffer memory 108/208 so that the data chunks can continue being read to the buffer memory 108/208. In this manner, the data chunks may be pulled from long-term storage.

At time 6 (T6), one or more data chunks that are read from long-term storage at time 5 may be modified and subsequently re-written to the cache memory device 106/206 (e.g., buffer memory 108/208) consistent with a read-write operation. The re-written data chunk(s) may be written (re-written) to long-term storage at time 7 (T7). In a situation in which a re-written data chunk in the buffer memory becomes a LRU data chunk and is not yet written (re-written) to long-term storage, the re-written data chunk may be written (re-written) to long-term storage prior to being deleted/removed from the buffer memory 108/208.

At various times (represented as time ! (e.g., T!)), the data objects and/or data chunks in long-term storage may be replicated or mirrored in a different long-term storage location. The data object(s) and/or data chunk(s) may be synchronously or asynchronously replicated/mirrored as the data object(s) and/or data chunk(s) are written (re-written) to long-term storage. Accordingly, T! may represent any time equal to or subsequent to time 4, including a time subsequent to time 7.

Referring now to FIGS. 5A through 5G, FIG. 5A is a block diagram illustrating an Example 500 representing multiple data chunks (e.g., data chunks 510a through 510d) shown in initial positions (e.g., positions 512a through 512d) of a LRU technique. This embodiment includes four data chunks (e.g., data chunks 510a through 510d, which may be collectively referred to as data chunks 510), although further embodiments may include other quantities of data chunks 510 (e.g., two or more data chunks). In Example 500, a left-most position 512a (e.g., the position initially occupied by data chunk 510a) is the most recently used (MRU) position and a right-most position 512d (e.g., the position initially occupied by data chunk 510d) is the LRU position, with positions 512b and 512c being intermediate positions (e.g., LRU+2 and LRU+1, respectively) and initially occupied by data chunk 510b and data chunk 510c, respectively).

In various embodiments, each time one of data chunks 510 is accessed (e.g., subject to an I/O operation (e.g., a write operation, a read operation, or a read-write operation), the accessed data chunk may move to position 512a (e.g., the MRU position) and the remaining data chunks may move, as needed, one position to the right toward the LRU position (e.g., position 512d). The following examples in FIGS. 5B through 5G are made with continued reference to FIG. 5A and may provide greater insight and understanding to the various LRU techniques discussed herein; however, the various LRU techniques discussed herein are not limited to the examples in FIGS. 5A through 5G.

Figure 5B:
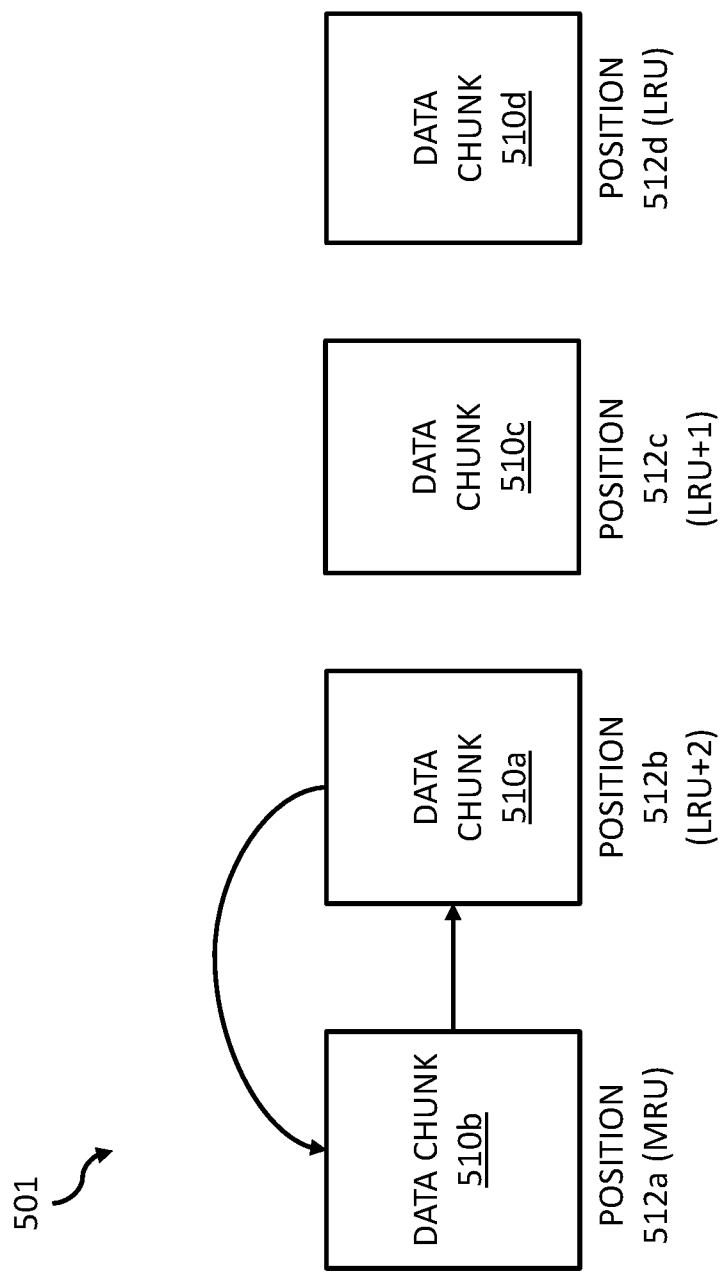

Example 501 in FIG. 5B: Data chunk 510b is accessed, which results in data chunk 510b being moved from position 512b to position 512a, data chunk 510a being moved from position 512a to 512b, and data chunks 510c and 510d remaining in positions 512c and 512d, respectively.

Figure 5C:
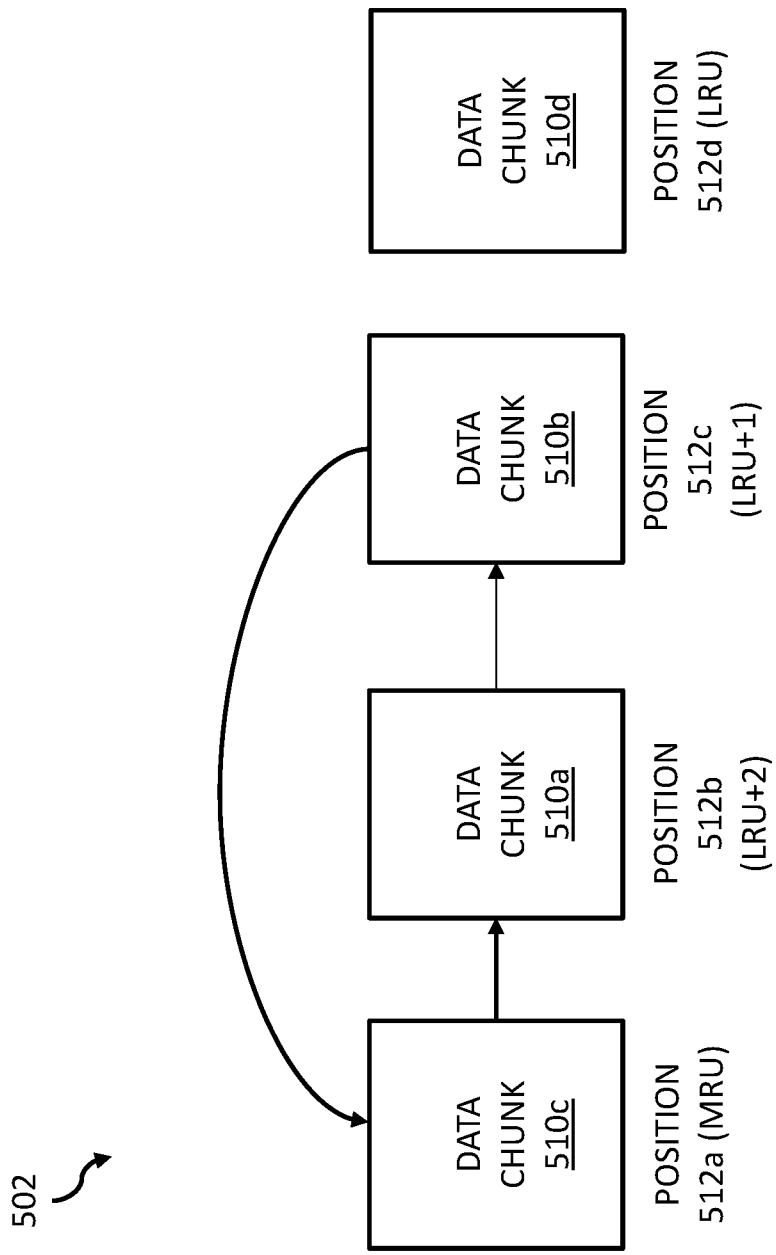

Example 502 in FIG. 5C: Data chunk 510c is accessed, which results in data chunk 510c being moved from position 512c to position 512a, data chunk 510a being moved from position 512a to position 512b, data chunk 510b being moved from position 512b to position 512c, and data chunk 510d remaining in position 512d.

Figure 5D:
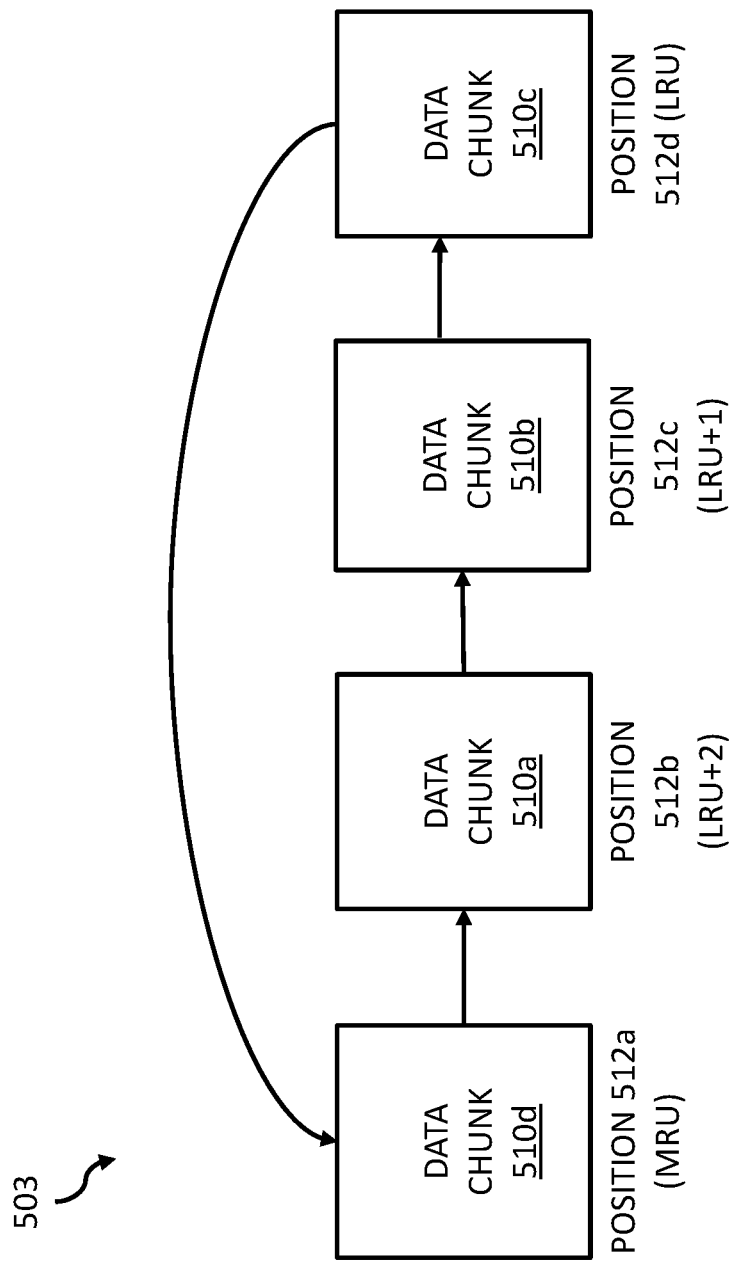

Example 503 in FIG. 5D: Data chunk 510d is accessed, which results in data chunk 510d being moved from position 512d to position 512a, data chunk 510a being moved from position 512a to 512b, data chunk 510b being moved from position 512b to position 512c, and data chunk 510c being moved from position 512c to position 512d.

Figure 5E:
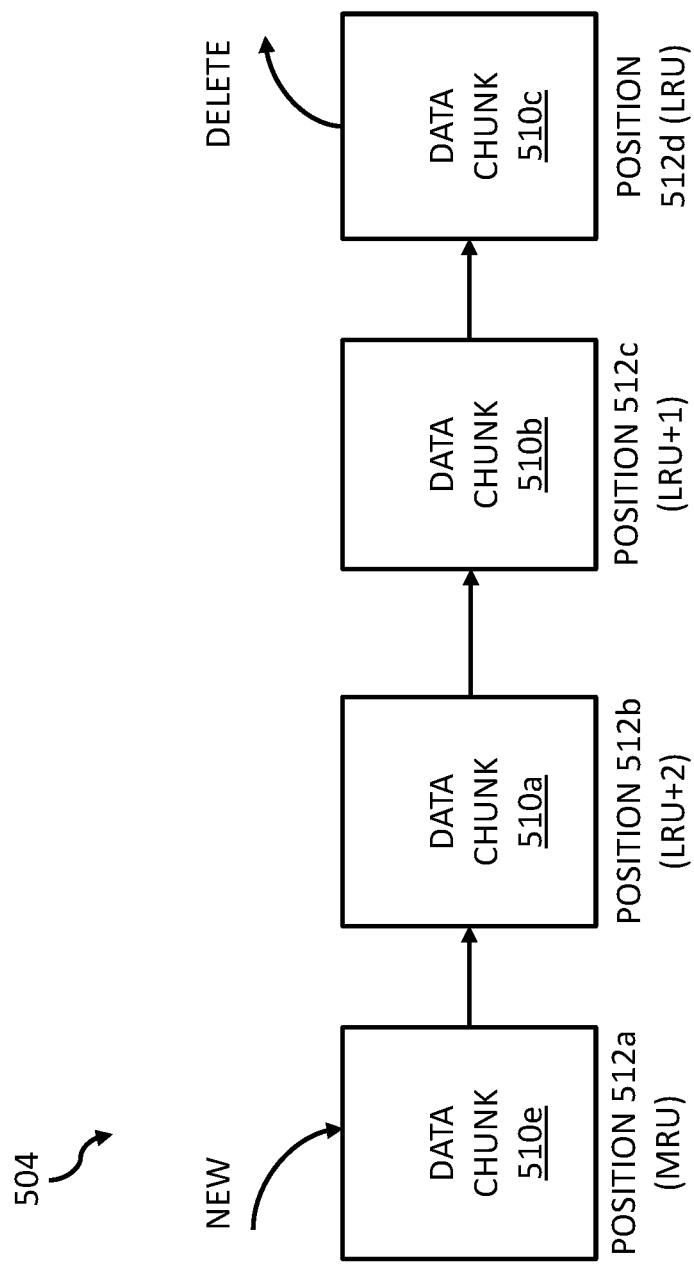

Example 504 in FIG. 5E: Data chunk 510a is accessed, which results in data chunks 510a, 510b, 510c, and 510d remaining in positions 510, 512b, 512c, and 512d, respectively.

Figure 5F:
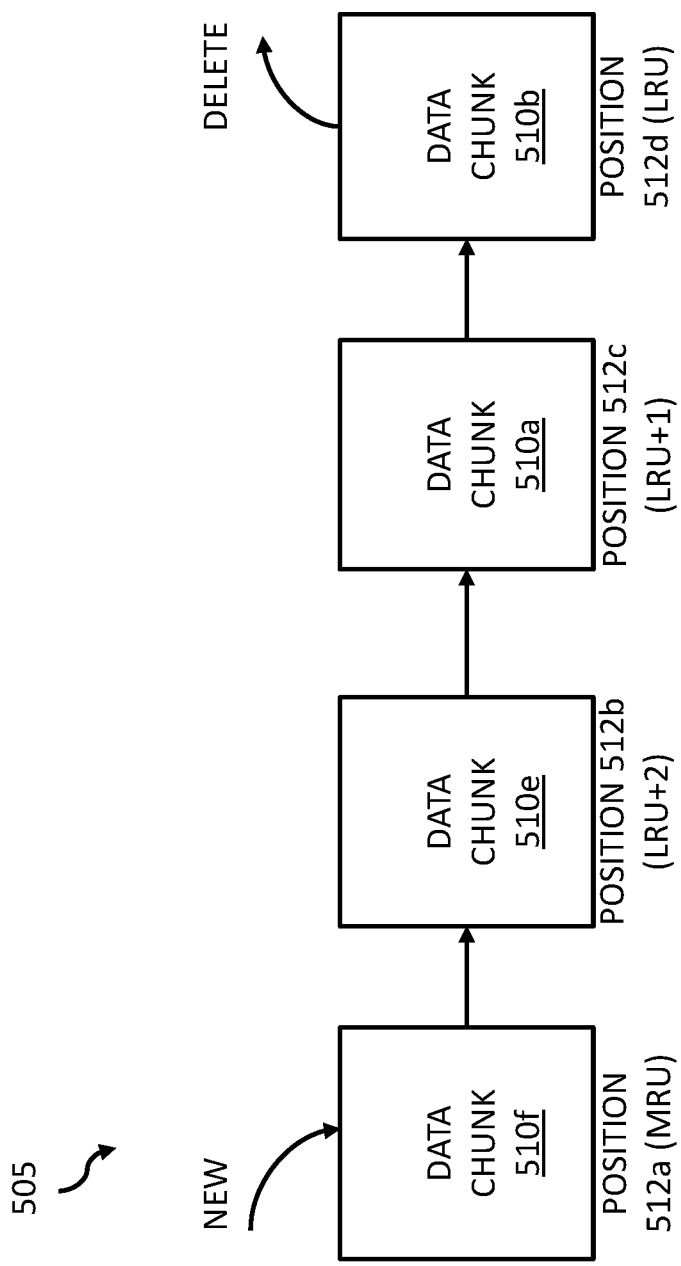

Example 505 in FIG. 5F: Data chunk 510c is accessed, which results in data chunk 510c being moved from position 512c to position 512a, data chunk 510a being moved from position 512a to 512b, data chunk 510b being moved from position 512b to position 512c, and data chunk 510d remaining in position 512d. Subsequently, data chunk 510d is accessed, which results in data chunk 510d being moved from position 512d to position 512a, data chunk 510c being moved from position 512a to position 512b, data chunk 510a being moved from position 512b to position 512c, and data chunk 510b being moved from position 512c to position 512d.

Example 506 in FIG. 5E: When a new data chunk (e.g., data chunk 510e) is accessed, data chunk 510e replaces the data chunk in the MRU position (data chunk 510a in position 512a in the example illustrated by diagram 500 of FIG. 5) and the data chunk in the LRU position (e.g., data chunk 510d in position 512d in FIG. 5) being deleted or removed from the buffer memory (e.g., buffer memory 108). Furthermore, the other data chunks (e.g., data chunks 510a, 510b, and 510c in FIG. 5) are each moved one position to the right or one position closer to the LRU position (position 512d in FIG. 5). Specifically, data chunk 510a is moved from position 512a to 512b, data chunk 510b is moved from position 512b to position 512c, and data chunk 510c is moved from position 512c to position 512d.

Figure 5G:
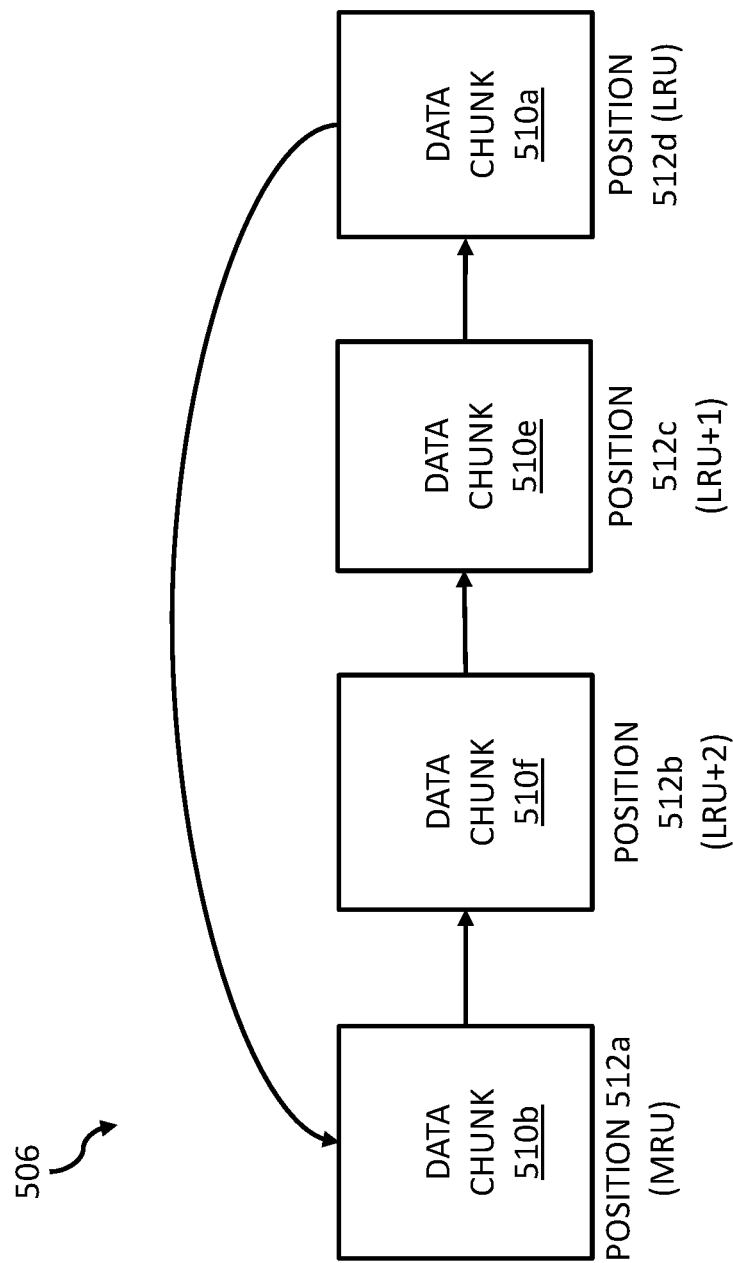

Example 507 in FIG. 5F: A subsequent newly accessed data chunk (e.g., data chunk 510f) would result in data chunk 510f being moved to the MRU position (e.g., position 512a), data chunk 510c being deleted/removed, and data chunks 510e, 510a, and 510b being moved to positions 512b, 512c, and 512d, respectively. FIG. 5G is a continuing illustrative example of FIG. 5F in which data chunk 510b is accessed subsequent to data chunk 510f; data chunk 510b is moved from the LRU position (e.g., position 512d) to the MRU position (e.g., position 512a), data chunk 510f is moved to position 512b, data chunk 510e is moved to position 512c, and data chunk 510a is moved to the LRU position (e.g., position 512d).

Figure 6:
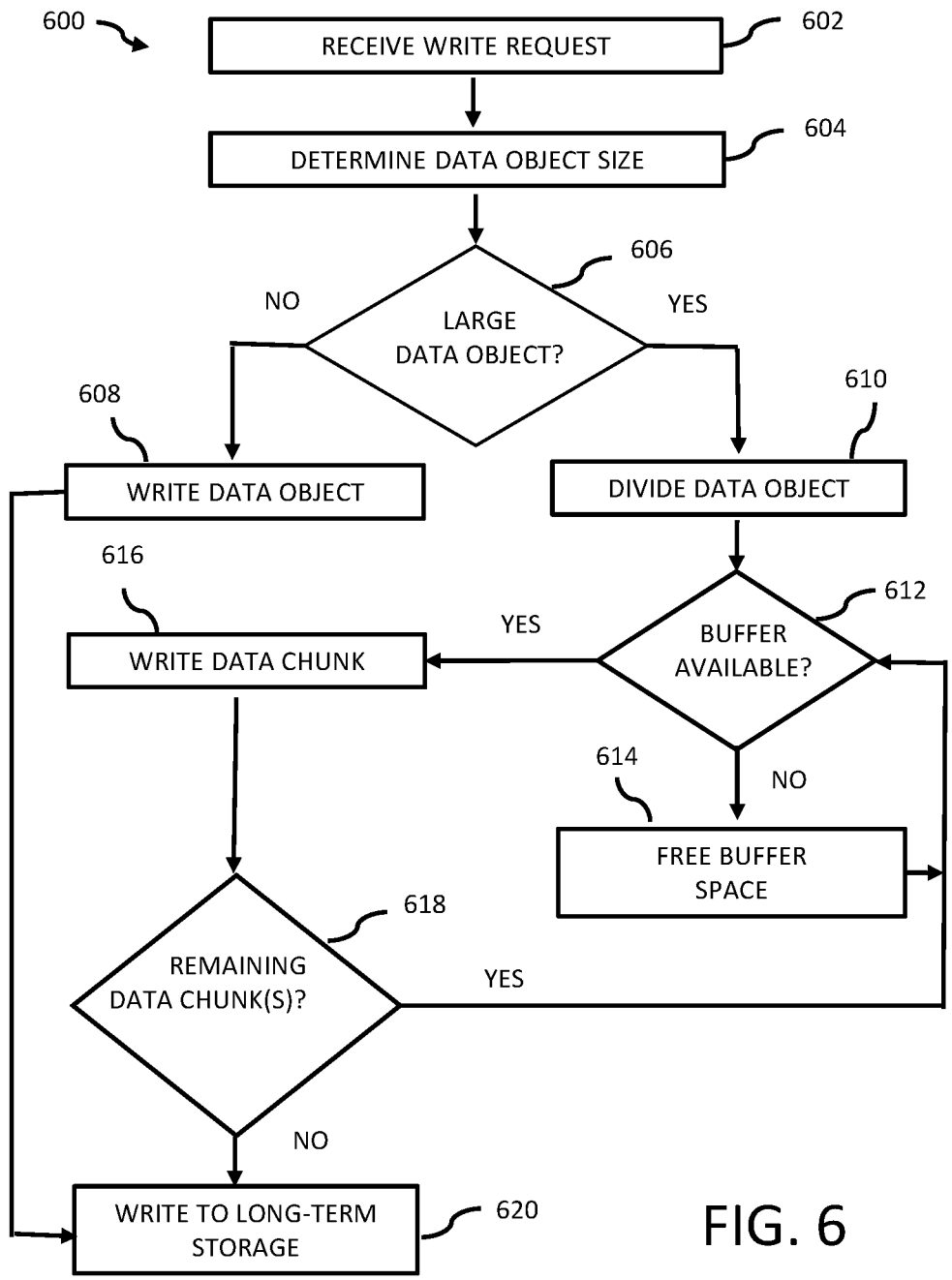
FIG. 6 is a block diagram of an example method for writing a data object to a buffer memory.

With reference now to FIG. 6, an example method 600 of writing a data object to a buffer memory 108/208 of a cache memory device 106/206 is illustrated. As shown, method 600 may begin by receiving an I/O request (e.g., a write request), by a storage controller 104/204, to store a data object (block 602) and may determine the size of the data object (block 604).

The data object size may be compared to a storage threshold and/or the size of a buffer memory 108/208 to determine if the data object size is larger than the storage threshold and/or buffer size (block 606). If/when the data object size is smaller than the storage threshold and/or buffer size (e.g., a NO in block 606), the data object may be determined to be a conforming data object and may be written to buffer memory 108/208, in its entirety (block 608). The conforming data object may be subsequently written to one or more of storage devices 102 and/or enterprise storage service 50 (block 620).

If/when the data object size is larger than the buffer size (e.g., a YES in block 606), the data object may be determined to be a non-conforming data object and may be divided (partitioned) into a plurality of data chunks (block 610). The data object may be divided into any desired number of data chunks and each data chunk may include any size suitable for storage in buffer memory 108/208, one or more of storage devices 102, and/or enterprise storage service 50, as discussed elsewhere herein.

Method 600 may further include determining if buffer memory 108/208 is available to store (buffer) a data chunk (block 612). Buffer memory 108/208 may be considered available if/when the buffer memory is not full; otherwise, buffer memory 108/208 may be considered unavailable.

If/when buffer memory 108/208 is unavailable (e.g., a NO in block 612), one or more data objects and/or one or more data chunks buffered in buffer memory 108/208 may be written to one or more of storage devices 102 and/or enterprise storage service 50 to free space in buffer memory 108/208 (block 614) and the availability of buffer memory 108/208 may again be determined (block 612). In various embodiments, the space in buffer memory 108/208 may be freed-up by pushing one or more data chunks through buffer memory 108/208 utilizing a LRU technique, as discussed elsewhere herein. If/when buffer memory 108/208 is available (e.g., a YES in block 612), one or more data chunks may be written to buffer memory 108/208 (block 616).

Method 600 may further include determining if/when there are one or more remaining data chunks in the data object to be written to buffer memory 108/208 (block 618). If/when there is at least one remaining data chunk to be written to buffer memory 108/208 (e.g., a YES in block 618), the availability of buffer memory 108/208 may be determined (block 612) and blocks 612 through 618 may be repeated until there are no more remaining data chunks to be written to buffer memory 108/208.

If/when there are no more remaining data chunks to be written to buffer memory 108/208 (e.g., a NO in block 618), a data chunk that is not stored in storage devices 102 or enterprise storage service 50 may be written to storage devices 102 and/or enterprise storage service 50 (block 620). In some embodiments, any remaining data chunk(s) may be written to storage devices 102 or enterprise storage service 50 immediately after or within a short period of time of being modified, while in other embodiments any remaining data chunk(s) may be written to storage devices 102 or enterprise storage service 50 at or subsequent to a predetermined time of being modified. Some remaining data chunk(s) may be written to storage devices 102 and/or enterprise storage service 50 in accordance with a LRU technique.

Figure 7:
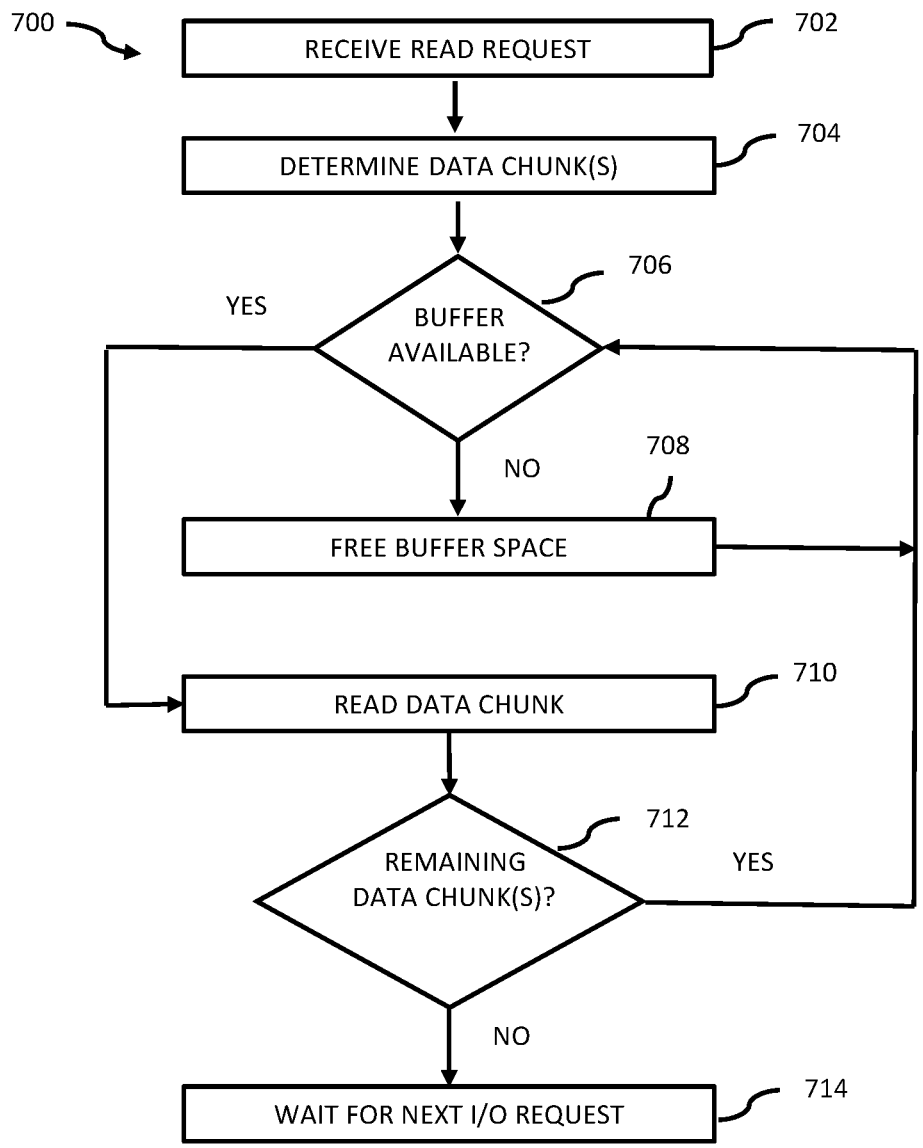
FIG. 7 is a block diagram of an example method for reading a data object to a buffer memory.

Referring now to FIG. 7, an example method 700 of reading a data object in storage devices 102 or enterprise storage service 50 to a buffer memory 108/208 of a cache memory device 106/206 is illustrated. As shown, method 700 may begin by receiving an I/O request (e.g., a read request), by a storage controller 104/204, to read data in a data object (block 702) and determining one or more data chunks in storage devices 102*a*, 102*b*, . . . 102*n* and/or enterprise data service 50 including the data (block 704). In some embodiments, the data chunks including the data desiring to be read may be stored or located in the same or different storage devices 102, as discussed elsewhere herein.

Method 700 may further include determining if buffer memory 108/208 into which the data chunk(s) are to be read is available to store (buffer) the data chunk(s) (block 706). Buffer memory 108/208 may be considered available if/when the buffer memory is not full; otherwise, buffer memory 108/208 may be considered unavailable.

If/when buffer memory 108/208 is unavailable (e.g., a NO in block 706), one or more data objects and/or one or more data chunks buffered in buffer memory 108/208 may be deleted from buffer memory 108/208 to free space in buffer memory 108/208 (block 708) and the availability of buffer memory 108/208 may again be determined (block 706). In various embodiments, the space in buffer memory 108/208 may be freed-up by deleting one or more data objects and/or data chunks from buffer memory 108/208 utilizing a LRU technique, as discussed elsewhere herein. Deleting one or more data objects and/or data chunks from buffer memory 108/208 may further include writing any data object(s) and/or data chunk(s) to storage device(s) 102 and/or enterprise storage service 50 that are not stored in or have not previously been written to storage devices 102 and/or enterprise storage service 50 prior to removal.

If/when buffer memory 108/208 is available (e.g., a YES in block 612), one or more data chunks including at least a portion of the desired data may be read to buffer memory 108/208 (block 710). Method 700 may further include determining if/when there are one or more remaining data chunks including at least a portion of the desired data to be read to buffer memory 108/208 (block 712).

If/when there is at least one remaining data chunk to be read to buffer memory 108/208 (e.g., a YES in block 712), the availability of buffer memory 108/208 may be determined (block 706) and blocks 706 through 712 may be repeated until there are no more remaining data chunks including desired data to be read to buffer memory 108/208 (e.g., a NO in block 712). Method 700 may further include waiting for a subsequent I/O request (block 714) and may repeat block 702 through block 714, as needed and/or desired.

Figure 8:
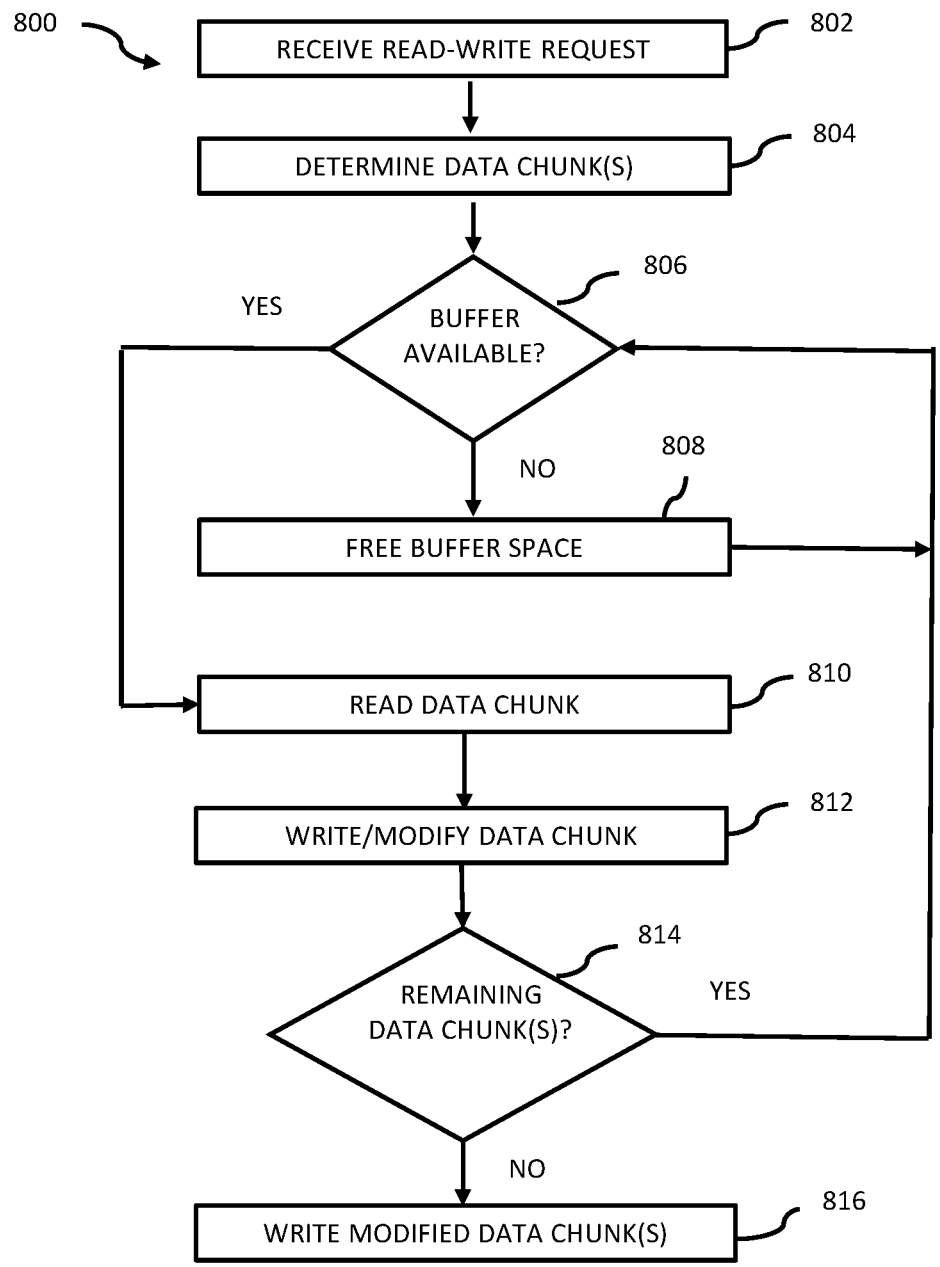
FIG. 8 is a block diagram of an example method for modifying a data object in long-term storage.

With reference now to FIG. 8, an example method 800 of modifying data of a data object in storage device(s) 102 or enterprise storage service 50 is illustrated. As shown, method 800 may begin by receiving an I/O request (e.g., a read-write request), by a storage controller 104/204, to modify data in a data object (block 802) and determining one or more data chunks in storage device(s) 102 and/or enterprise data service 50 including the desired data (block 804). In some embodiments, the data chunks including the data desiring modification may be stored or located in the same or different storage devices 102, as discussed elsewhere herein.

Method 800 may further include determining if a buffer memory 108/208 of a cache memory device 106/206 into which the data chunk(s) including the desired data are to be read is available to store (buffer) the data chunk(s) (block 806). Buffer memory 108/208 may be considered available if/when the buffer memory is not full; otherwise, buffer memory 108/208 may be considered unavailable.

If/when buffer memory 108/208 is unavailable (e.g., a NO in block 806), one or more data objects and/or one or more data chunks buffered in buffer memory 108/208 may be removed from buffer memory 108/208 to free space in buffer memory 108/208 (block 808) and the availability of buffer memory 108/208 may again be determined (block 806). In various embodiments, the space in buffer memory 108/208 may be freed-up by deleting one or more data objects and/or data chunks from buffer memory 108/208 utilizing a LRU technique, as discussed elsewhere herein. Deleting one or more data objects and/or data chunks from buffer memory 108/208 may further include writing any data object(s)

and/or data chunk(s) to storage device(s) 102 and/or enterprise data service 50 that are not stored in or have not previously been written to storage devices 102 and/or enterprise data service 50 prior to removal.

If/when buffer memory 108/208 is available (e.g., a YES in block 612), one or more data chunks including at least a portion of the data desiring modification may be read to buffer memory 108/208 (block 810). The data chunk(s) read to buffer memory 108/208 may be subsequently modified (e.g., data may be deleted from and/or new data may be written to the data chunk(s)) (block 812).

Method 800 may further include determining if there are one or more remaining data chunks including at least a portion of the data desiring modification (block 814). If/when there is at least one remaining data chunk to be modified (e.g., a YES in block 814), the availability of buffer memory 108/208 may again be determined (block 806) and blocks 806 through 814 may be repeated until there are no more remaining data chunks including data desiring modification (e.g., a NO in block 814).

The modified one or more data chunks may be eventually written (re-written) to storage devices 102 and/or enterprise data service 50 (block 816). In some embodiments, the modified data chunk(s) may be written to storage device(s) 102 and/or enterprise data service 50 immediately after or within a short period of time of being modified, while in other embodiments the modified data chunk(s) may be written to storage devices 102 and/or enterprise data service 50 at or subsequent to a predetermined time of being modified. Some modified data chunk(s) may be written to storage device(s) 102 and/or enterprise data service 50 in accordance with a LRU technique, as discussed elsewhere herein.

To review, the various networks, systems, and methods discussed above may include hardware and/or software to increase reliability and/or decrease latency issues associated with writing data objects, and particularly LOBs, by dividing a data object into smaller data chunks and writing each data chunks to buffer memory 108/208 in succession. That is, the various embodiments discussed herein may be characterized as performing a plurality of write operations on a LOB over a period of time.

In addition, the various networks, systems, and methods discussed above may include hardware and/or software to decrease latency issues associated with reading data in data objects, and particularly LOBs, by reading one or more smaller data chunks from storage devices 102 and/or enterprise data service 50 to buffer memory 108/208 in succession. That is, the various embodiments discussed herein may be characterized as performing a plurality of reads operations on a LOB over a period of time.

Furthermore, the various networks, systems, and methods discussed above may include hardware and/or software to decrease latency issues associated with modifying data in data objects, and particularly LOBs, by reading one or more smaller data chunks from storage devices 102 and/or enterprise data service 50 to buffer memory 108/208 in succession, modifying the data chunk(s), and writing/re-writing the modified data chunk(s) to storage device(s) 102 and/or enterprise data service 50. That is, the various embodiments discussed herein may be characterized as performing multiple read-write operations on a LOB over a period of time.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A non-volatile memory system, comprising:
 a first non-volatile cache memory device including a storage threshold; and
 a storage controller coupled to the first non-volatile cache memory device, the storage controller including one or more processing devices for executing instructions in one or more applications configured to cause the storage controller to perform operations comprising:
  receiving an input/output (I/O) request for a data object;
  determining the data object to be a non-conforming data object relative to the storage threshold of the first non-volatile cache memory device;
  dividing the non-conforming data object into a plurality of data chunks, each of the data chunks having a size that is less than the storage threshold;
  assigning a thread configured to execute on the storage controller exclusive access to the non-conforming data object, wherein the thread is configured to service I/O operations received from one or more clients for the plurality of data chunks;
  periodically moving one or more data chunks to a long-term memory device at a predetermined time interval to free up one or more memory spaces of the first non-volatile cache memory device;
  storing one or more data chunks of the non-conforming data object in the freed-up one or more memory spaces of the first non-volatile cache memory device; and
  performing, using the thread assigned exclusive access to the non-conforming data object, I/O operations for the one or more data chunks of the non-conforming data object in the first non-volatile cache memory device.

2. The system of claim 1, wherein:
 the I/O request is a write request; and
 the storage controller, when performing the operations for storing the one or more data chunks of the non-conforming data object, further performs operations comprising writing each of the one or more data chunks of the non-conforming data object to the freed-up one or more memory spaces of the first non-volatile cache memory device.

3. The system of claim 1, wherein:
 the I/O request is a read request; and
 the storage controller, when performing the operations for storing the one or more data chunks of the non-conforming data object, further performs operations comprising reading one or more data chunks stored in the long-term memory device to the first non-volatile cache memory device.

4. The system of claim 1, wherein:
 the I/O request is a read-write request; and
 the storage controller, when performing the operations for storing the one or more data chunks of the non-conforming data object, further performs operations comprising:
  reading one or more data chunks stored in the long-term memory device to the first non-volatile cache memory device;
  modifying data in the one or more read data chunks to generate one or more modified data chunks; and
  writing the one or more modified data chunks to the long-term memory device.

5. The system of claim 1, further comprising the long-term memory device coupled to the first non-volatile cache memory device, wherein:
 determining the data object to be a non-conforming data object is further based on a size of the data object exceeding an available storage capacity of the first non-volatile cache memory device; and
 storing the one or more data chunks of the non-conforming data object in the freed-up one or more memory spaces includes, for each data chunk of the non-conforming data object:

determining whether there is sufficient space for storing each data chunk in the first non-volatile cache memory device; and when there is not sufficient space:
writing one or more existing data chunks that are associated with one or more data objects other than the non-conforming data object and currently stored in the first non-volatile cache memory device to the long-term memory device;
freeing up the one or more memory spaces of the one or more existing data chunks to generate the freed-up one or more memory spaces; and
writing each data chunk to the freed-up one or more memory spaces in the first non-volatile cache memory device.

6. The system of claim 1, wherein:
the first non-volatile cache memory device includes a buffer size; and
the storage threshold reflects the buffer size.

7. The system of claim 1, further comprising:
a second non-volatile cache memory device coupled to the first non-volatile cache memory device, wherein:
the storage controller further performs operations comprising replicating each data chunk stored in the first non-volatile cache memory device to the second non-volatile cache memory device.

8. The system of claim 1, wherein the long-term memory device is one of:
a portion of a local storage network; and
a portion of an enterprise storage service.

9. The system of claim 1, wherein the first non-volatile cache memory device comprises a flash memory device.

10. The system of claim 1, wherein:
the storage controller is configured to be coupled to a network that is in communication with one or more client devices; and
the storage controller is located between the one or more client devices and the first non-volatile cache memory device when coupled to the network.

11. A system, comprising:
a non-volatile cache memory device including a buffer size;
means for receiving an input/output (I/O) request for a data object;
means for determining the data object to be a non-conforming data object relative to the buffer size of the non-volatile cache memory device;
means for dividing the non-conforming data object into a plurality of data chunks, each of the data chunks having a size that is less than the buffer size;
means for assigning a thread configured to execute on the means for determining exclusive access to the non-conforming data object, wherein the thread is configured to service I/O operations received from one or more clients for the plurality of data chunks;
means for periodically moving one or more data chunks stored in one or more memory spaces of the non-volatile cache memory device to a long-term memory device at a predetermined time interval to free up one or more memory spaces of the non-volatile cache memory device;
means for storing one or more data chunks of the non-conforming data object in the freed-up one or more memory spaces of the non-volatile cache memory device; and
means for performing, using the thread assigned exclusive access to the non-conforming data object, I/O operations for the one or more data chunks of the non-conforming data object in the non-volatile cache memory device.

12. The system of claim 11, wherein:
the I/O request is a write request; and
the means for storing the one or more data chunks of the non-conforming data object further comprises means for writing each of the one or more data chunks of the non-conforming data object to the freed-up one or more memory spaces of the non-volatile cache memory device.

13. The system of claim 11, wherein:
the I/O request is a read request; and
the means for storing the one or more data chunks of the non-conforming data object further comprises means for reading one or more data chunks stored in the long-term memory device to the non-volatile cache memory device.

14. The system of claim 11, wherein:
the I/O request is a read-write request; and
the means for storing the one or more data chunks of the non-conforming data object further comprises:
means for reading one or more data chunks stored in the long-term memory device to the non-volatile cache memory device;
means for modifying data in the one or more read data chunks to generate one or more modified data chunks; and
means for writing the one or more modified data chunks to the long-term memory device.

15. The system of claim 11, further comprising the long-term memory device coupled to the non-volatile cache memory device, wherein:
the means for determining the data object to be a non-conforming data object comprises means for basing the determination on a size of the data object exceeding the buffer size; and
the means for storing the one or more data chunks of the non-conforming data object in the freed-up one or more memory spaces includes, for each data chunk of the non-conforming data object:
means for determining whether there is sufficient space for storing each data chunk in the non-volatile cache memory device; and
when there is not sufficient space:
means for writing one or more existing data chunks that are associated with one or more data objects other than the non-conforming data object and currently stored in the non-volatile cache memory device to the long-term memory device;
means for freeing up the one or more memory spaces of the one or more existing data chunks to generate the freed-up one or more memory spaces; and
means for writing each data chunk to the freed-up one or more memory spaces in the non-volatile cache memory device.

16. A method of operation in a non-volatile memory system including a set of non-volatile memory devices, the method comprising:
receiving, at a storage controller coupled to a non-volatile cache memory device including a storage threshold, an input/output (I/O) request for executing an I/O operation on a data object;
determining the data object to be a non-conforming data object relative to the storage threshold of the non-volatile cache memory device;

dividing the non-conforming data object into a plurality of data chunks, each of the data chunks having a size that is less than the storage threshold;

assigning a thread configured to execute on the storage controller exclusive access to the non-conforming data object, wherein the thread is configured to service I/O operations received from one or more clients for the plurality of data chunks;

periodically moving one or more data chunks stored in one or more memory spaces of the non-volatile cache memory device to a long-term memory device at a predetermined time interval to free up one or more memory spaces of the non-volatile cache memory device;

storing one or more data chunks of the non-conforming data object in the freed-up one or more memory spaces of the non-volatile cache memory device; and performing, using the thread assigned exclusive access to the non-conforming data object, I/O operations for the one or more data chunks of the non-conforming data object in the non-volatile cache memory device.

17. The method of claim 16, wherein:
the I/O request is a write request; and
storing the one or more data chunks of the non-conforming data object further comprises writing each of the one or more data chunks of the non-conforming data object to the freed-up one or more memory spaces of the non-volatile cache memory device.

18. The method of claim 16, wherein:
the I/O request is a read request; and
storing the one or more data chunks of the non-conforming data object further comprises reading each of the one or more data chunks of the non-conforming data object to the freed-up one or more memory spaces of the non-volatile cache memory device.

19. The method of claim 16, wherein:
the I/O request is a read-write request; and
storing the one or more data chunks of the non-conforming data object further comprises:
reading each of the one or more data chunks of the non-conforming data object to the freed-up one or more memory spaces of the non-volatile cache memory device;
modifying data in each of the one or more read data chunks to generate one or more modified data chunks; and
writing each of the one or more modified data chunks to the long-term memory device.

20. The method of claim 16, wherein:
determining the data object to be a non-conforming data object is further based on a size of the data object exceeding an available storage capacity of the non-volatile cache memory device; and
storing the one or more data chunks of the non-conforming data object in the freed-up one or more memory spaces includes, for each data chunk of the non-conforming data object:
determining whether there is sufficient space for storing each data chunk in the non-volatile cache memory device; and
when there is not sufficient space:
writing one or more existing data chunks that are associated with one or more data objects other than the non-conforming data object and currently stored in the non-volatile cache memory device to the long-term memory device;
freeing up the one or more memory spaces of the one or more existing data chunks to generate the freed-up one or more memory spaces; and
writing each data chunk to the freed-up one or more memory spaces in the non-volatile cache memory device.

* * * * *